United States Patent
Kim et al.

(10) Patent No.: US 9,986,188 B2
(45) Date of Patent: May 29, 2018

(54) UNIT PIXEL OF IMAGE SENSOR AND IMAGE SENSOR HAVING THE SAME

(71) Applicant: Samsung Electronics Co., Ltd., Suwon-Si, Gyeonggi-Do (KR)

(72) Inventors: Tae-Chan Kim, Yongin-si (KR); Moo-Young Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 777 days.

(21) Appl. No.: 14/231,859

(22) Filed: Apr. 1, 2014

(65) Prior Publication Data

US 2014/0374572 A1 Dec. 25, 2014

(30) Foreign Application Priority Data

Jun. 19, 2013 (KR) .......................... 10-2013-0070402

(51) Int. Cl.
*H04N 5/3745* (2011.01)

(52) U.S. Cl.
CPC ................................. *H04N 5/3745* (2013.01)

(58) Field of Classification Search
CPC .. H04N 5/369; H04N 5/3741; H04N 5/37457; H04N 5/23251; H04N 5/23254; H04N 5/23245; H04N 5/343
USPC ................ 250/208.1, 214 A, 214 LS, 214 R, 250/214 SW, 214 AL, 214.1; 348/294–324
See application file for complete search history.

(56) References Cited

U.S. PATENT DOCUMENTS

| | | | | |
|---|---|---|---|---|
| 7,129,463 B2* | 10/2006 | Jung | ....................... | H03F 3/082 250/214 LS |
| 7,277,130 B2* | 10/2007 | Korthout | ................ | H04N 3/155 250/208.1 |
| 8,253,810 B2* | 8/2012 | Myers | ................ | H04N 5/23248 348/208.1 |
| 9,001,220 B2* | 4/2015 | Kim | ....................... | H04N 5/351 348/208.14 |

(Continued)

FOREIGN PATENT DOCUMENTS

| KR | 2009-0120889 A | 11/2009 |
|---|---|---|
| KR | 2010-0066226 A | 6/2010 |

*Primary Examiner* — Kevin Pyo
*Assistant Examiner* — Don Williams
(74) *Attorney, Agent, or Firm* — Harness, Dickey & Dickey, P.L.C.

(57) ABSTRACT

A unit pixel of an image sensor includes a photoelectric conversion unit, a mode control unit, a first signal generation unit and a second signal generation unit. The photoelectric conversion unit generates photo-charges in response to incident light and provides the photo-charges to a first node. The mode control unit prevents the photo-charges from being discharged from the first node in a first operation mode, and generates a sensing current by discharging the photo-charges and generates a sensing voltage proportional to the sensing current in a second operation mode. The first signal generation unit generates an analog signal based on an amount of the photo-charges accumulated in the first node in the first operation mode. The second signal generation unit generates an on signal and an off signal based on a change of the sensing voltage in the second operation mode. The unit pixel provides various sensing outputs effectively.

20 Claims, 15 Drawing Sheets

(56) References Cited

U.S. PATENT DOCUMENTS

| | | | |
|---|---|---|---|
| 2009/0086071 A1* | 4/2009 | Kagawa | G01J 1/46 |
| | | | 348/300 |
| 2010/0314543 A1 | 12/2010 | Lee et al. | |
| 2010/0321289 A1 | 12/2010 | Kim et al. | |
| 2011/0181254 A1* | 7/2011 | Ritter | G01J 1/46 |
| | | | 323/234 |
| 2011/0193968 A1 | 8/2011 | Lee | |
| 2011/0227868 A1 | 9/2011 | Chen et al. | |
| 2011/0310005 A1 | 12/2011 | Chen et al. | |
| 2012/0049048 A1* | 3/2012 | Dyer | G01J 1/44 |
| | | | 250/214 AL |
| 2012/0132821 A1* | 5/2012 | Kuwabara | G01T 1/2018 |
| | | | 250/370.08 |
| 2012/0133955 A1 | 5/2012 | Baxter | |
| 2012/0280129 A1* | 11/2012 | Sun | H04N 5/33 |
| | | | 250/338.4 |

\* cited by examiner

FIG. 12
810a
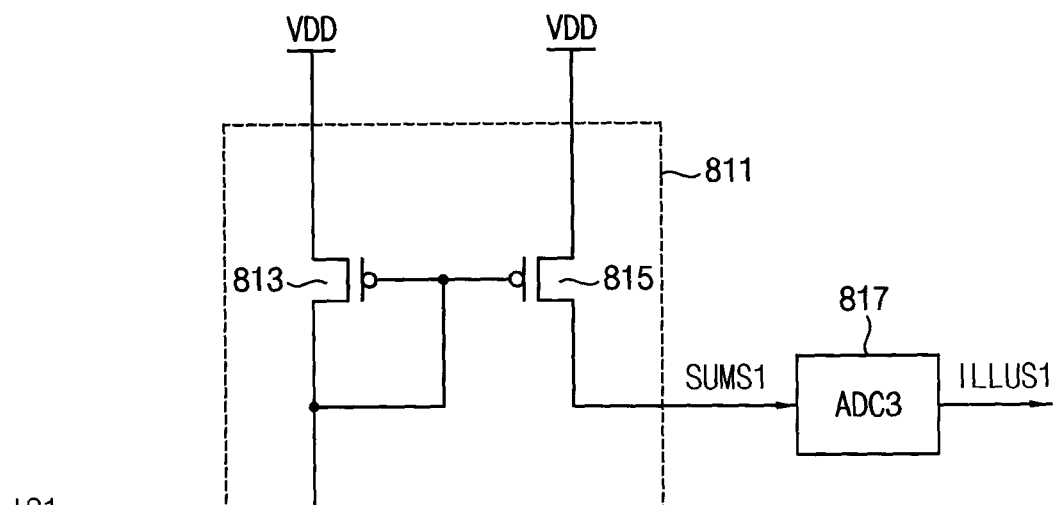
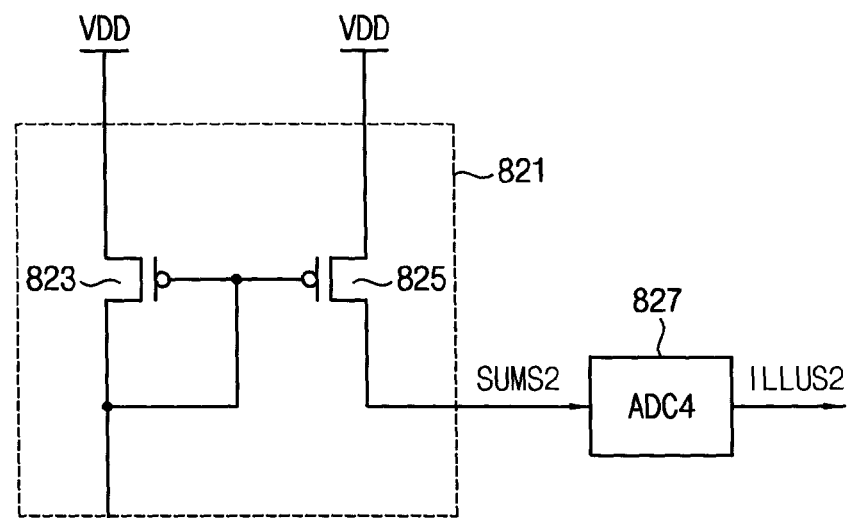

UNIT PIXEL OF IMAGE SENSOR AND IMAGE SENSOR HAVING THE SAME

CROSS-REFERENCE TO RELATED APPLICATION(S)

This application claims priority under 35 USC § 119 to Korean Patent Application No. 10-2013-0070402, filed on Jun. 19, 2013 in the Korean Intellectual Property Office (KIPO), the contents of which are herein incorporated by reference in their entirety.

BACKGROUND

1. Technical Field

Example embodiments relate to an image sensor, and more particularly to a unit pixel of an image sensor that generates various sensing outputs.

2. Description of the Related Art

A mobile device may separately include a two dimensional image sensor capturing a two dimensional image, a motion sensor detecting a motion of a subject, an ambient light sensor detecting an illuminance of ambient light, a proximity sensor detecting a distance to a subject, etc.

However, when many sensors are included in a mobile device, power consumption and a size of the mobile device may increase.

SUMMARY

Some example embodiments are directed to provide a unit pixel of an image sensor that provides various kinds of sensing outputs effectively.

Some example embodiments are directed to provide an image sensor including the unit pixel.

According to example embodiments, a unit pixel of an image sensor includes a photoelectric conversion unit, a mode control unit, a first signal generation unit and a second signal generation unit. The photoelectric conversion unit generates photo-charges in response to incident light and provides the photo-charges to a first node. The mode control unit prevents the photo-charges from being discharged from the first node in a first operation mode, and generates a sensing current by discharging the photo-charges and generates a sensing voltage proportional to the sensing current in a second operation mode. The first signal generation unit generates an analog signal based on an amount of the photo-charges accumulated in the first node in the first operation mode. The second signal generation unit generates an on signal and an off signal based on a change of the sensing voltage in the second operation mode.

In example embodiments, the mode control unit may include an n-type metal oxide semiconductor (NMOS) transistor including a gate, a source coupled to the first node and a drain outputting the sensing current, an amplifier coupled between the first node and the gate of the NMOS transistor and configured to generate the sensing voltage proportional to the sensing current, and a switch coupled between the gate of the NMOS transistor and a ground voltage and configured to be turned on in the first operation mode and turned off in the second operation mode in response to a mode signal.

In example embodiments, the second signal generation unit may include a differentiation unit configured to generate an accumulation voltage by accumulating a time derivative of the sensing voltage, a first comparator configured to output the on signal by comparing a magnitude of the accumulation voltage and a magnitude of a first reference voltage, and a second comparator configured to output the off signal by comparing the magnitude of the accumulation voltage and a magnitude of a second reference voltage.

The differentiation unit may reset the accumulation voltage in response to a reset signal.

In example embodiments, the first signal generation unit may include a reset transistor including a source coupled to the first node, a drain coupled to a supply voltage, and a gate receiving a reset control signal, a drive transistor including a source, a drain coupled to the supply voltage, and a gate coupled to the first node, and a row selection transistor including a drain coupled to the source of the drive transistor, a gate receiving a row selection signal, and a source outputting the analog signal.

In example embodiments, the first signal generation unit may include a transmission transistor including a source coupled to the first node, a drain corresponding to a floating diffusion area, and a gate receiving a transmission control signal, a reset transistor including a source coupled to the floating diffusion area, a drain coupled to a supply voltage, and a gate receiving a reset control signal, a drive transistor including a source, a drain coupled to the supply voltage, and a gate coupled to the floating diffusion area, and a row selection transistor including a drain coupled to the source of the drive transistor, a gate receiving a row selection signal, and a source outputting the analog signal.

According to example embodiments, an image sensor includes a pixel array, a first analog-digital conversion unit, a motion detection unit and a light intensity detection unit. The pixel array includes a plurality of unit pixels arranged in rows and columns, where each of the unit pixels generates an analog signal having a magnitude corresponding to an intensity of incident light in a first operation mode, and generates a sensing current having a magnitude corresponding to the intensity of the incident light and generates an on signal and an off signal based on a change of the sensing current in a second operation mode. The first analog-digital conversion unit converts the analog signal to a digital signal in the first operation mode. The motion detection unit detects a motion of a subject based on the on signal and the off signal provided from each of the unit pixels in the second operation mode. The light intensity detection unit detects the intensity of the incident light based on a sum of the sensing currents provided from the unit pixels in the second operation mode.

In example embodiments, in the second operation mode, each of the unit pixels may generate a sensing voltage proportional to the sensing current, generate an accumulation voltage by accumulating a time derivative of the sensing voltage, generate the on signal by comparing a magnitude of the accumulation voltage and a magnitude of a first reference voltage, and generate the off signal by comparing the magnitude of the accumulation voltage and a magnitude of a second reference voltage.

In example embodiments, each of the unit pixels may include a photoelectric conversion unit configured to generate photo-charges in response to the incident light and to provide the photo-charges to a first node, a mode control unit configured to prevent the photo-charges from being discharged from the first node in the first operation mode, and configured to generate the sensing current by discharging the photo-charges and to generate a sensing voltage proportional to the sensing current in the second operation mode, a first signal generation unit configured to generate the analog signal based on an amount of the photo-charges accumulated in the first node in the first operation mode, and a second signal generation unit configured to generate the on signal and the off signal based on a change of the sensing voltage in the second operation mode.

The motion detection unit may include a buffer unit, an arbitration unit configured to store an on coordinate in the buffer unit when receiving the on signal from the pixel array, and configured to store an off coordinate in the buffer unit when receiving the off signal from the pixel array, and a calculation unit configured to calculate a moving direction and a speed of the subject based on the on coordinate and the off coordinate stored in the buffer unit. The on coordinate may correspond to a location of a unit pixel that provided the on signal to the arbitration unit, and the off coordinate may correspond to a location of a unit pixel that provided the off signal to the arbitration unit.

The second signal generation unit may include a differentiation unit configured to generate an accumulation voltage by accumulating a time derivative of the sensing voltage, and configured to reset the accumulation voltage in response to a reset signal, a first comparator configured to output the on signal by comparing a magnitude of the accumulation voltage and a magnitude of a first reference voltage, and a second comparator configured to output the off signal by comparing the magnitude of the accumulation voltage and a magnitude of a second reference voltage. The arbitration unit may provide the reset signal to a unit pixel when receiving the on signal or the off signal from the unit pixel.

In example embodiments, the light intensity detection unit may include a current mirror configured to sum the sensing currents provided from the unit pixels to generate a sum signal, and a second analog-digital conversion unit configured to generate an illuminance data corresponding to an illuminance of ambient light by performing an analog-digital conversion on the sum signal.

In example embodiments, the image sensor may further include a light source configured to generate an infrared light signal. The pixel array may include first unit pixels configured to operate in response to a visible light signal and second unit pixels configured to operate in response to the infrared light signal, which is incident to the pixel array after being reflected by the subject. The light intensity detection unit may generate a first illuminance data corresponding to an illuminance of ambient light based on a sum of the sensing currents provided from the first unit pixels, and generate a second illuminance data corresponding to a distance from the pixel array to the subject based on a sum of the sensing currents provided from the second unit pixels.

The light intensity detection unit may include a first current mirror configured to sum the sensing currents provided from the first unit pixels to generate a first sum signal, a second analog-digital conversion unit configured to generate the first illuminance data by performing an analog-digital conversion on the first sum signal, a second current mirror configured to sum the sensing currents provided from the second unit pixels to generate a second sum signal, and a third analog-digital conversion unit configured to generate the second illuminance data by performing an analog-digital conversion on the second sum signal.

The light intensity detection unit may include a first current mirror configured to sum the sensing currents provided from the first unit pixels to generate a first sum signal, a second current mirror configured to sum the sensing currents provided from the second unit pixels to generate a second sum signal, a multiplexer configured to output one of the first sum signal and the second sum signal in response to a selection signal, and a second analog-digital conversion unit configured to generate one of the first illuminance data and the second illuminance data by performing an analog-digital conversion on an output signal of the multiplexer.

In at least one example embodiment, the image sensor may include an array of unit pixels including photoelectric converters, the units pixels including at least first unit pixels configured to detect an intensity of visible light reflected thereon and sense at least illuminance of the light and motion of a subject based on the intensity of the visible light.

In at least one example embodiment, the first unit pixels are configured to detect the intensity of the visible light by accumulating charges generated by corresponding ones of the photoelectric converters at a first node, if the image sensor is in a first operation mode, and the first unit pixels are configured to sense the motion and the illuminance, if the image sensor is in a second operation mode.

In at least one example embodiment, in the second operation mode, the first unit pixels are configured to, generate a first sensing current having a magnitude corresponding to the intensity of the visible light by discharging the accumulated charges at the first nodes of the first unit pixels, accumulate voltages proportional to the intensity of the visible light in the first unit pixels, generate comparison signals if the accumulated voltages are greater than or less than reference voltages, and reset the accumulated voltages based on the generation of the comparison signals.

In at least one example embodiment, the image sensor is configured to, sense a speed of the subject based on a time interval between the comparison signals stored in a buffer, sense a direction of the subject based on which one of the first unit pixels in the array are generating the comparison signals, and sense the illuminance based on a sum of the first sensing currents.

In at least one example embodiment, the unit pixels further include second unit pixels, each of the second unit pixels configured to, detect the intensity of infrared light reflected thereon from the subject by accumulating charges at a respective first node, the accumulated charges generated by corresponding ones of the photoelectric converters, and generate a second sensing current having a magnitude corresponding to the intensity of the infrared light by discharging the accumulated charges at the first nodes of the second unit pixels, and the light intensity detection unit is further configured to sense a proximity to the subject based on a sum of the second sensing currents.

BRIEF DESCRIPTION OF THE DRAWINGS

Illustrative, non-limiting example embodiments will be more clearly understood from the following detailed description in conjunction with the accompanying drawings.

FIG. 12 is a circuit diagram illustrating an example of a light intensity detection unit included in an image sensor of FIG. 11;

DETAILED DESCRIPTION OF THE EMBODIMENTS

Figure 1:
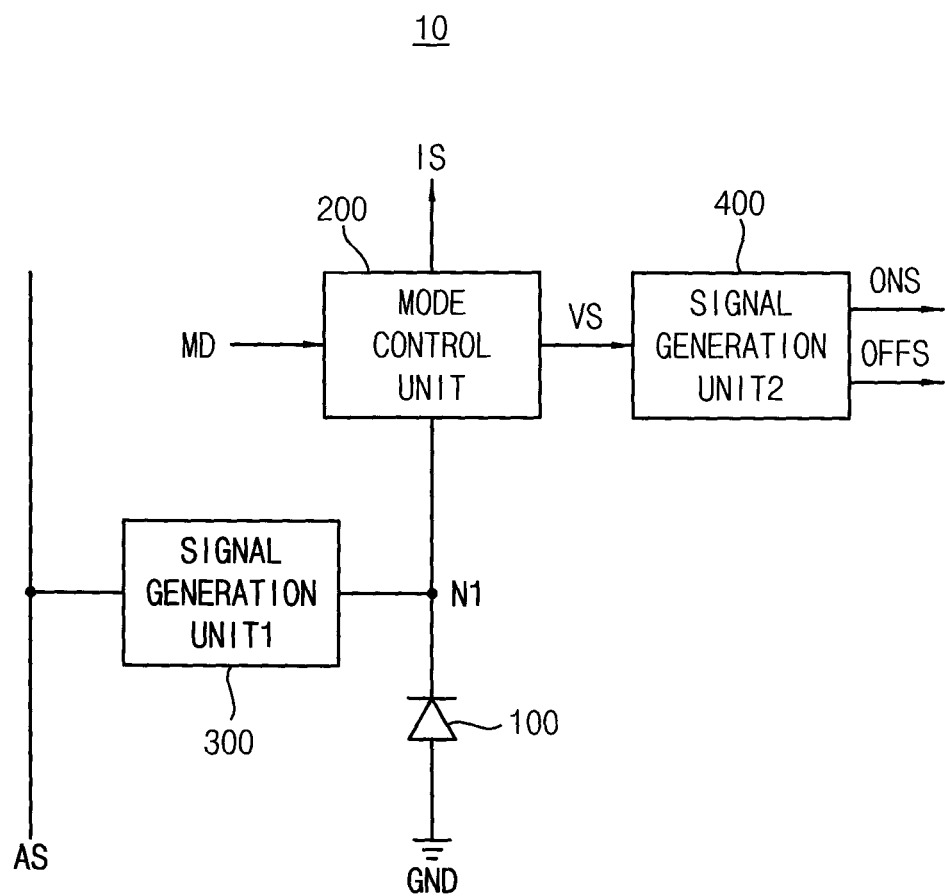
FIG. 1 is a block diagram illustrating a unit pixel of an image sensor according to example embodiments.

Various example embodiments will be described more fully with reference to the accompanying drawings, in which some example embodiments are shown. The inventive concepts may, however, be embodied in many different forms and should not be construed as limited to the embodiments set forth herein. Rather, these example embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a unit pixel of an image sensor according to example embodiments.

Referring to FIG. 1, a unit pixel 10 includes a photoelectric conversion unit 100, a mode control unit 200, a first signal generation unit 300 and a second signal generation unit 400.

The photoelectric conversion unit 100 generates photo-charges in response to incident light and provides the photo-charges to a first node N1. An amount of the photo-charges generated from the photoelectric conversion unit 100 may correspond to an intensity of incident light thereon. In some example embodiments, the photoelectric conversion unit 100 may include a photodiode.

The mode control unit 200 operates in at least one of a first operation mode and a second operation mode in response to a mode signal MD. For example, the mode control unit 200 may operate in the first operation mode when the mode signal MD has a first logic level, and operate in the second operation mode when the mode signal MD has a second logic level. The mode control unit 200 is turned off in the first operation mode to prevent the photo-charges from being discharged from the first node N1. The mode control unit 200 is turned on in the second operation mode to generate a sensing current IS by discharging the photo-charges. In addition, the mode control unit 200 may generate a sensing voltage VS proportional to the sensing current IS in the second operation mode.

The first signal generation unit 300 generates an analog signal AS based on an amount of the photo-charges accumulated in the first node N1 in the first operation mode.

The second signal generation unit 400 generates an on signal ONS and an off signal OFFS based on a change of the sensing voltage VS in the second operation mode.

An output electrode of the first signal generation unit 300 outputting the analog signal AS in the first operation mode is different from an output electrode of the mode control unit 200 outputting the sensing current IS in the second operation mode.

Figure 2:
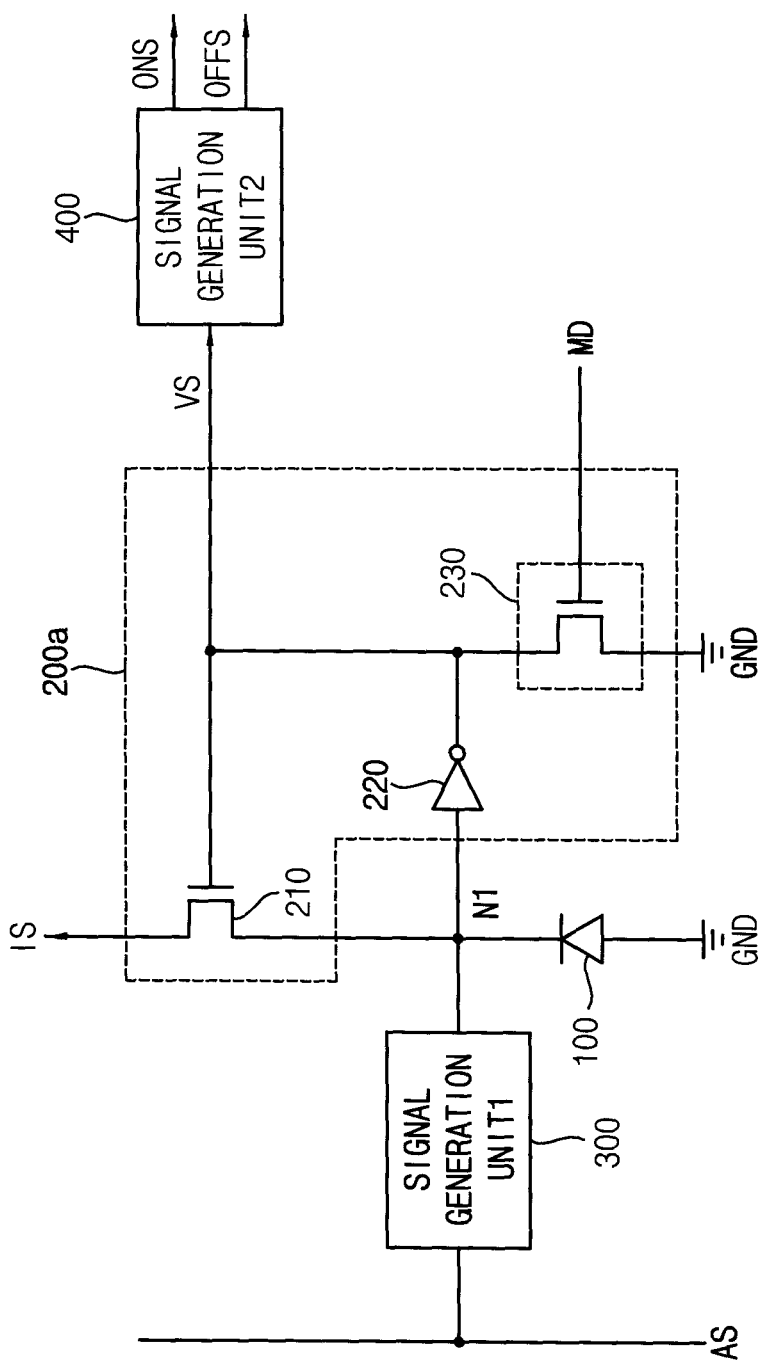
FIG. 2 is a circuit diagram illustrating an example of a mode control unit included in a unit pixel of FIG. 1.

FIG. 2 is a circuit diagram illustrating an example of a mode control unit included in a unit pixel of FIG. 1.

Referring to FIG. 2, a mode control unit 200a may include a first n-type metal oxide semiconductor (NMOS) transistor 210, an amplifier 220 and a switch 230.

The first NMOS transistor 210 may include a gate, a source coupled to the first node N1 and a drain outputting the sensing current IS.

The amplifier 220 may be coupled between the first node N1 and the gate of the NMOS transistor 210. The amplifier 220 may generate the sensing voltage VS having a magnitude proportional to a magnitude of the sensing current IS that flows through the first NMOS transistor 210, and provide the sensing voltage VS to the gate of the NMOS transistor 210. For example, the amplifier 220 may generate the sensing voltage VS having a magnitude logarithmically proportional to the magnitude of the sensing current IS.

The switch 230 may be coupled between the gate of the NMOS transistor 210 and a ground voltage GND, and be switched in response to the mode signal MD. For example, the switch 230 may be turned on in the first operation mode during which the mode signal MD has the first logic level, and be turned off in the second operation mode during which the mode signal MD has the second logic level. In some example embodiments, as illustrated in FIG. 2, the switch 230 may include an NMOS transistor having a gate receiving the mode signal MD. In this case, the mode signal MD may have a logic high level in the first operation mode such that switch 230 may be turned on in response to the mode signal MD in the first operation mode, and the mode signal MD may have a logic low level in the second operation mode such that switch 230 may be turned off in response to the mode signal MD in the second operation mode.

Since the switch 230 is turned on in the first operation mode, the gate of the first NMOS transistor 210 and an output electrode of the amplifier 220 may be kept at the ground voltage GND such that the first NMOS transistor 210 may be turned off. Therefore, the first NMOS transistor 210 may not discharge the photo-charges through the first NMOS transistor 210 such that the photo-charges generated from the photoelectric conversion unit 100 may be accumulated in the first node N1.

Since the switch 230 is turned off in the second operation mode, the first NMOS transistor 210 may discharge the photo-charges generated from the photoelectric conversion unit 100 through the first NMOS transistor 210 to generate the sensing current IS, and the amplifier 220 may generate the sensing voltage VS having a magnitude logarithmically proportional to the magnitude of the sensing current IS and provide the sensing voltage VS to the gate of the NMOS transistor 210. As described above, since an amount of the photo-charges generated from the photoelectric conversion unit 100 and accumulated in the first node N1 is proportional to the intensity of the incident light, the magnitude of the sensing current IS generated from the first NMOS transistor 210 in the second operation mode and the magnitude of the sensing voltage VS generated from the amplifier 220 in the second operation mode may be proportional to the intensity of the incident light.

Figure 3:
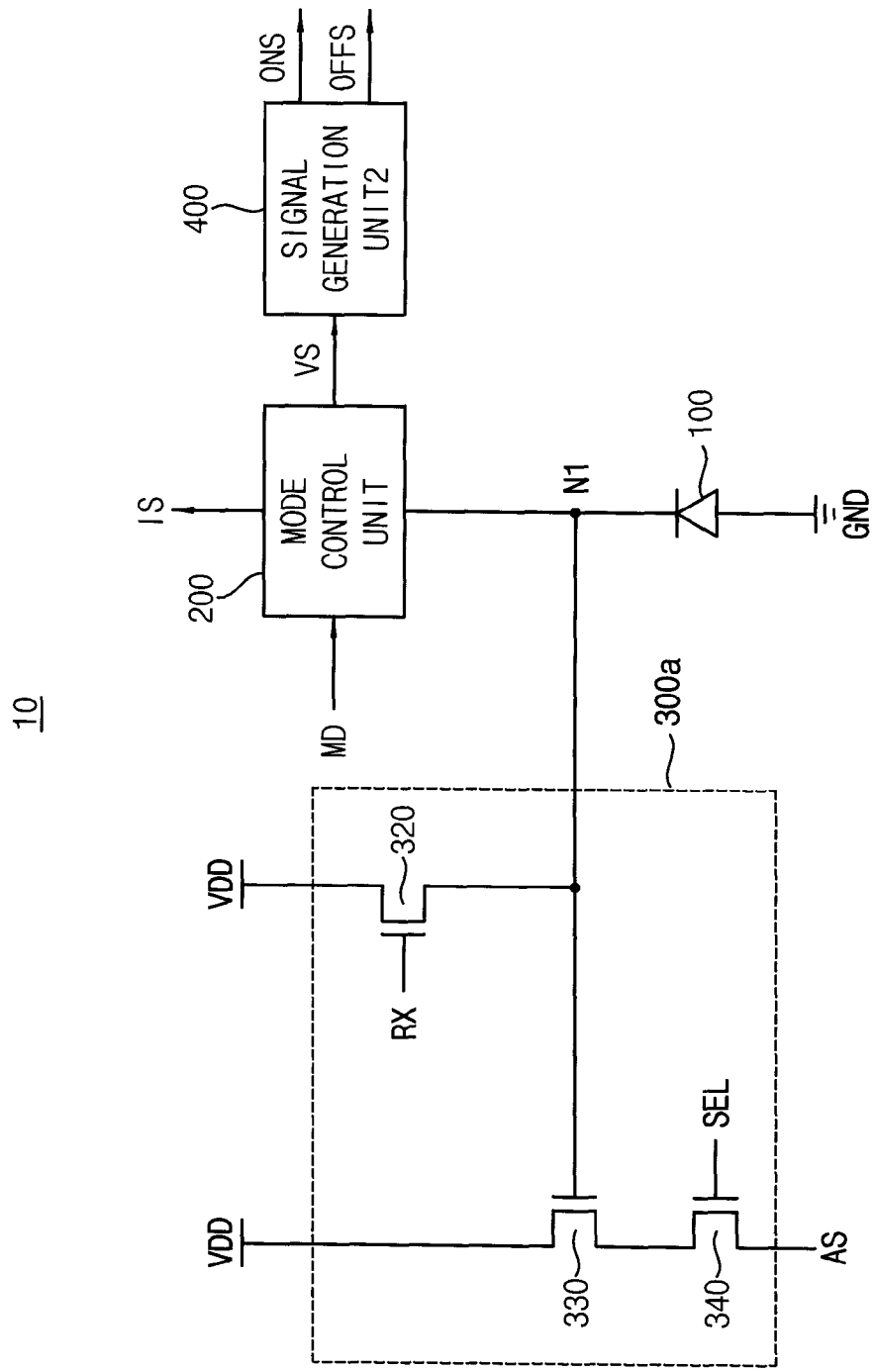
FIG. 3 is a circuit diagram illustrating an example of a first signal generation unit included in a unit pixel of FIG. 1.

FIG. 3 is a circuit diagram illustrating an example of a first signal generation unit included in a unit pixel of FIG. 1.

Referring to FIG. 3, a first signal generation unit 300a may include a reset transistor 320, a drive transistor 330 and a row selection transistor 340.

The reset transistor 320 may include a source coupled to the first node N1, a drain coupled to a supply voltage VDD, and a gate receiving a reset control signal RX.

The drive transistor 330 may include a source coupled to a drain of the row selection transistor 340, a drain coupled to the supply voltage VDD, and a gate coupled to the first node N1.

The row selection transistor 340 may include a drain coupled to the source of the drive transistor 330, a gate receiving a row selection signal SEL, and a source outputting the analog signal AS.

In the first operation mode, when an activated reset control signal RX is provided to the gate of the reset transistor 320, the reset transistor 320 may be turned on, and the photo-charges accumulated in the first node N1 may be discharged to the supply voltage VDD through the reset transistor 320 such that a voltage of the first node N1 may be initialized to the supply voltage VDD.

After that, the reset transistor 320 may be turned off in response to a deactivated reset control signal RX, and the photo-charges generated from the photoelectric conversion unit 100 may be accumulated in the first node N1. Therefore, a voltage of the first node N1, which corresponds to a voltage of the gate of the drive transistor 330, may be changed based on an amount of the photo-charges accumulated in the first node N1. When an activated row selection signal SEL is provided to the gate of the row selection transistor 340, the row selection transistor 340 may be turned on such that the row selection transistor 340 may output the analog signal AS corresponding to the voltage of the first node N1.

In this way, the first signal generation unit 300a may generate the analog signal AS in the first operation mode based on the amount of the photo-charges accumulated in the first node N1.

As will be described later with reference to FIG. 8, the reset control signal RX and the row selection signal SEL may be provided from a control unit of an image sensor including the unit pixel 10.

Figure 4:
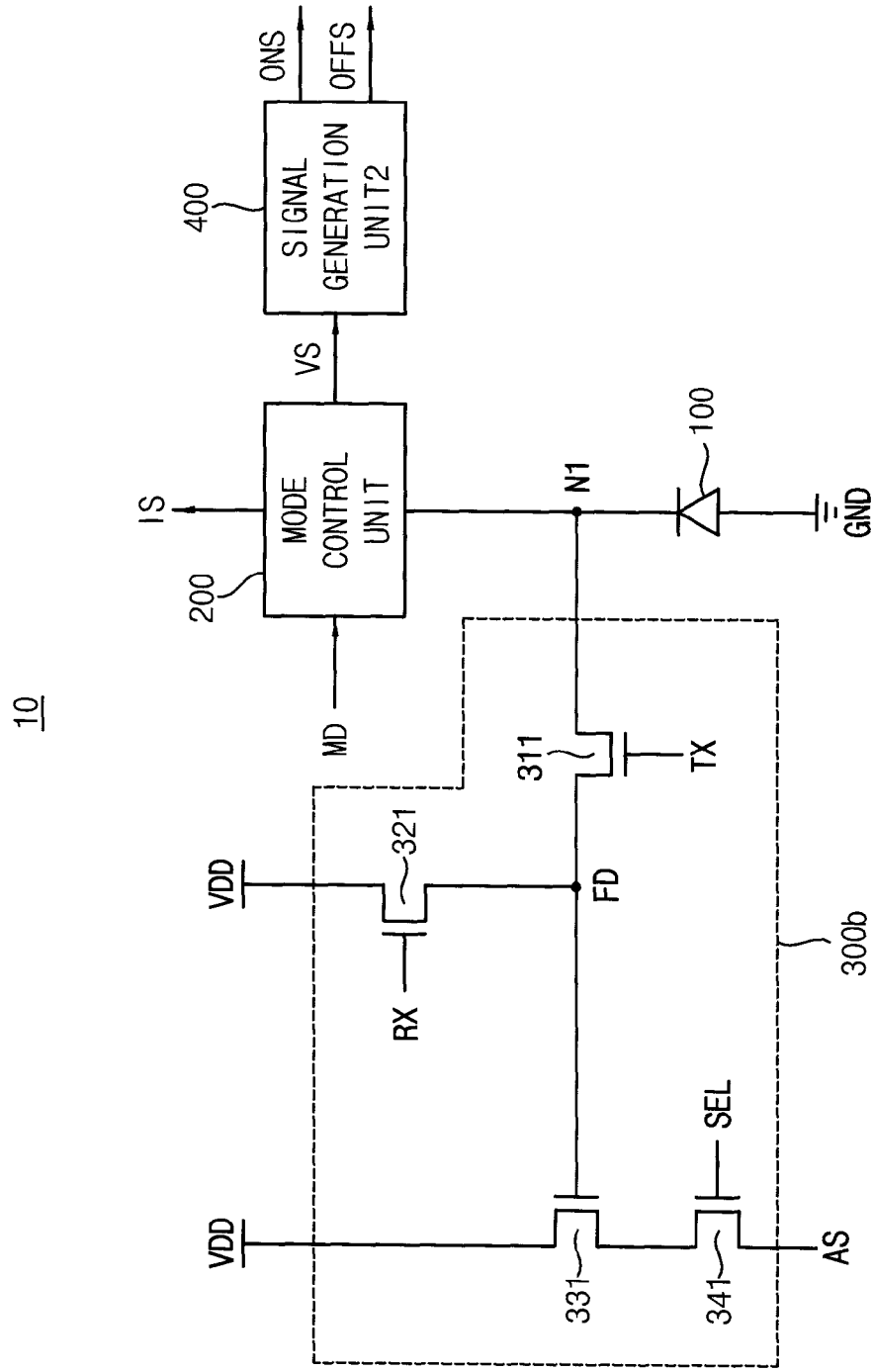
FIG. 4 is a circuit diagram illustrating another example of a first signal generation unit included in a unit pixel of FIG. 1.

FIG. 4 is a circuit diagram illustrating another example of a first signal generation unit included in a unit pixel of FIG. 1.

Referring to FIG. 4, a first signal generation unit 300b may include a transmission transistor 311, a reset transistor 321, a drive transistor 331 and a row selection transistor 341.

The transmission transistor 311 may include a source coupled to the first node N1, a drain corresponding to a floating diffusion area FD, and a gate receiving a transmission control signal TX.

The reset transistor 321 may include a source coupled to the floating diffusion area FD, a drain coupled to a supply voltage VDD, and a gate receiving a reset control signal RX.

The drive transistor 331 may include a source coupled to a drain of the row selection transistor 341, a drain coupled to the supply voltage VDD, and a gate coupled to the floating diffusion area FD.

The row selection transistor 341 may include a drain coupled to the source of the drive transistor 331, a gate receiving a row selection signal SEL, and a source outputting the analog signal AS.

In the first operation mode, when a deactivated transmission control signal TX is provided to the gate of the transmission transistor 311 and an activated reset control signal RX is provided to the gate of the reset transistor 321, the transmission transistor 311 may be turned off such that the photo-charges generated from the photoelectric conversion unit 100 may be accumulated in the first node N1, and the reset transistor 321 may be turned on such that the photo-charges stored in the floating diffusion area FD may be discharged to the supply voltage VDD through the reset transistor 321 and a voltage of the floating diffusion area FD may be initialized to the supply voltage VDD.

After that, the reset transistor 321 may be turned off in response to a deactivated reset control signal RX and the transmission transistor 311 may be turned on in response to an activated transmission control signal TX. In this case, the photo-charges accumulated in the first node N1 may be transferred to the floating diffusion area FD through the transmission transistor 311. Therefore, a voltage of the floating diffusion area FD, which corresponds to a voltage of the gate of the drive transistor 331, may be changed based on an amount of the photo-charges transferred from the first node N1 to the floating diffusion area FD. When an activated row selection signal SEL is provided to the gate of the row selection transistor 341, the row selection transistor 341 may be turned on such that the row selection transistor 341 may output the analog signal AS corresponding to the voltage of the floating diffusion area FD.

In this way, the first signal generation unit 300b may generate the analog signal AS in the first operation mode based on the amount of the photo-charges accumulated in the first node N1.

As will be described later with reference to FIG. 8, the transmission control signal TX, the reset control signal RX and the row selection signal SEL may be provided from a control unit of an image sensor including the unit pixel 10.

Figure 5:
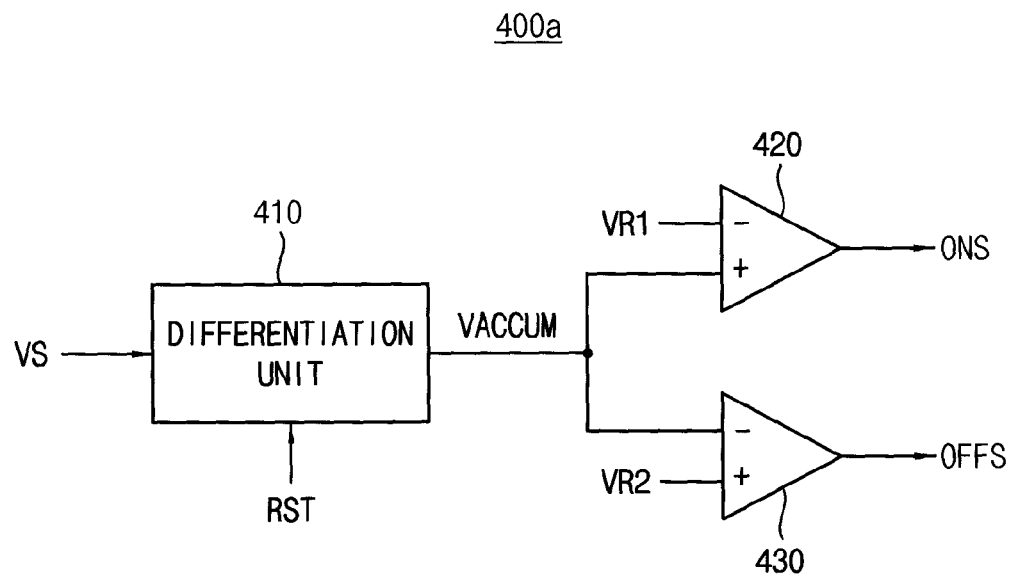
FIG. 5 is a block diagram illustrating an example of a second signal generation unit included in a unit pixel of FIG. 1.

FIG. 5 is a block diagram illustrating an example of a second signal generation unit included in a unit pixel of FIG. 1.

Referring to FIG. 5, a second signal generation unit 400a may include a differentiation unit 410, a first comparator 420 and a second comparator 430.

The differentiation unit 410 may receive the sensing voltage VS from the mode control unit 200 in the second operation mode, and generate an accumulation voltage VACCUM by accumulating a time derivative of the sensing voltage VS. The differentiation unit 410 may reset the accumulation voltage VACCUM in response to a reset signal RST.

As described above, since the magnitude of the sensing voltage VS generated from the mode control unit 200 in the second operation mode is proportional to the intensity of the incident light, the accumulation voltage VACCUM may correspond to an accumulation of a time derivative of the intensity of the incident light.

As discussed in more detail below, the first comparator 420 and the second comparator 430 may utilize the accumulation voltage VACCUM to determine whether to output the on signal ONS or the off signal OFFS.

Figure 6:
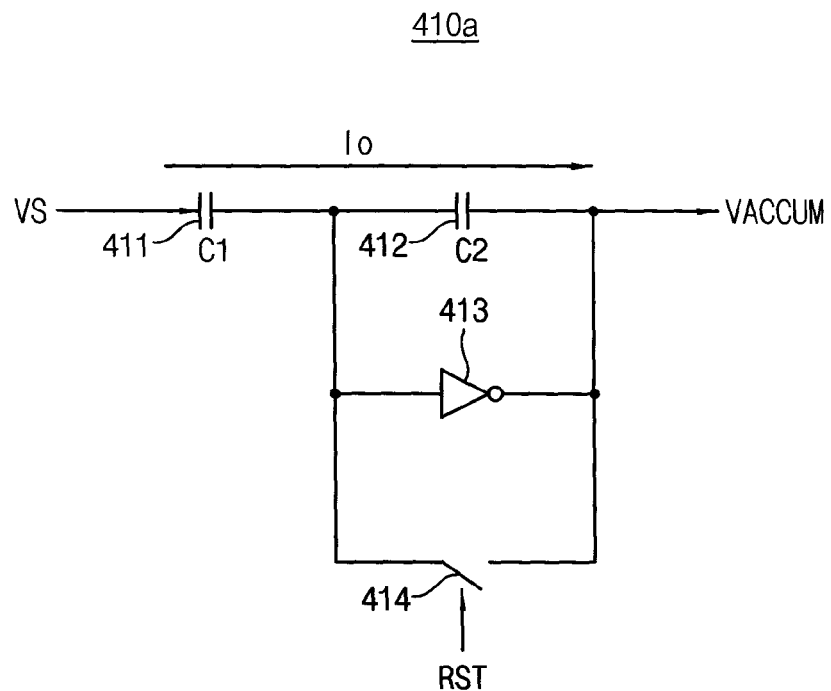
FIG. 6 is a circuit diagram illustrating an example of a differentiation unit included in a second signal generation unit of FIG. 5.

FIG. 6 is a circuit diagram illustrating an example of a differentiation unit included in a second signal generation unit of FIG. 5.

Referring to FIG. 6, a differentiation unit 410a may include a first capacitor 411, a second capacitor 412, an inverting amplifier 413 and a reset switch 414.

The first capacitor 411 may have a first electrode receiving the sensing voltage VS and a second electrode coupled to an input electrode of the inverting amplifier 413.

The second capacitor 412 may be coupled between an output electrode of the inverting amplifier 413 and the input electrode of the inverting amplifier 413 such that the second capacitor 412 may provide a feedback path to the inverting amplifier 413.

The reset switch 414 may be coupled between the output electrode of the inverting amplifier 413 and the input electrode of the inverting amplifier 413, and be switched in response to the reset signal RST.

The inverting amplifier 413 may output the accumulation voltage VACCUM at the output electrode.

When the reset signal RST is activated, the reset switch 414 may be turned on such that the second capacitor 412 may be discharged and the accumulation voltage VACCUM may be reset to a desired (or alternatively, a predetermined) voltage.

When reset signal RST is deactivated, the reset switch 414 may be turned off. Since the second capacitor 412 provides the feedback path to the inverting amplifier 413, a voltage of the input electrode of the inverting amplifier 413 may be kept substantially in a constant voltage. That is, the input electrode of the inverting amplifier 413 may be a virtual ground. Therefore, a first current Io having a magnitude proportional to the time derivative of the sensing voltage VS may flow through the first capacitor 411 and the second capacitor 412. The first current Io may be represented as [Equation 1].

$$Io = C1 * \frac{d(VS)}{dt} \qquad \text{[Equation 1]}$$

In [Equation 1], C1 represents a capacitance of the first capacitor 411.

Since the first capacitor 411 and the second capacitor 412 are charged by the first current Io and the accumulation voltage VACCUM is proportional to an amount of charges charged in the second capacitor 412, the accumulation voltage VACCUM may be represented as [Equation 2].

$$VACCUM = -\frac{C1}{C2} + \int \frac{d(VS)}{dt} \qquad \text{[Equation 2]}$$

In [Equation 2], C2 represents a capacitance of the second capacitor 412.

As represented in [Equation 2], the accumulation voltage VACCUM may decrease when the sensing voltage VS increases, and the accumulation voltage VACCUM may increase when the sensing voltage VS decreases.

As described above with reference to FIG. 6, the differentiation unit 410a may generate the accumulation voltage VACCUM by accumulating the time derivative of the sensing voltage VS.

The differentiation unit 410a illustrated in FIG. 6 is an example of the differentiation unit 410 included in the second signal generation unit 400a of FIG. 5, and example embodiments are not limited thereto. The differentiation unit 410 may be implemented in various structures.

Referring again to FIG. 5, the first comparator 420 may output the on signal ONS by comparing a magnitude of the accumulation voltage VACCUM and a magnitude of a first reference voltage VR1. For example, the first comparator 420 may output the on signal ONS when the accumulation voltage VACCUM is lower than the first reference voltage VR1.

The second comparator 430 may output the off signal OFFS by comparing the magnitude of the accumulation voltage VACCUM and a magnitude of a second reference voltage VR2. For example, the second comparator 430 may output the off signal OFFS when the accumulation voltage VACCUM is higher than the second reference voltage VR2.

Therefore, when the intensity of the incident light increases, the sensing voltage VS may increase and the accumulation voltage VACCUM may decrease. If the accumulation voltage VACCUM decreases below the first reference voltage VR1, the first comparator 420 may output the on signal ONS.

Alternatively, when the intensity of the incident light decreases, the sensing voltage VS may decrease and the accumulation voltage VACCUM may increase. If the accumulation voltage VACCUM increases above the second reference voltage VR2, the second comparator 430 may output the off signal OFFS.

As will be described later with reference to FIG. 8, when one of the on signal ONS and the off signal OFFS is generated from the second signal generation unit 400a, an activated reset signal RST may be provided to the differentiation unit 410. Therefore, whenever the second signal generation unit 400a generates one of the on signal ONS and the off signal OFFS, the second signal generation unit 400a may reset the accumulation voltage VACCUM, generate the accumulation voltage VACCUM again by accumulating the time derivative of the sensing voltage VS, and generate the on signal ONS and the off signal OFFS based on the accumulation voltage VACCUM.

Figure 7:
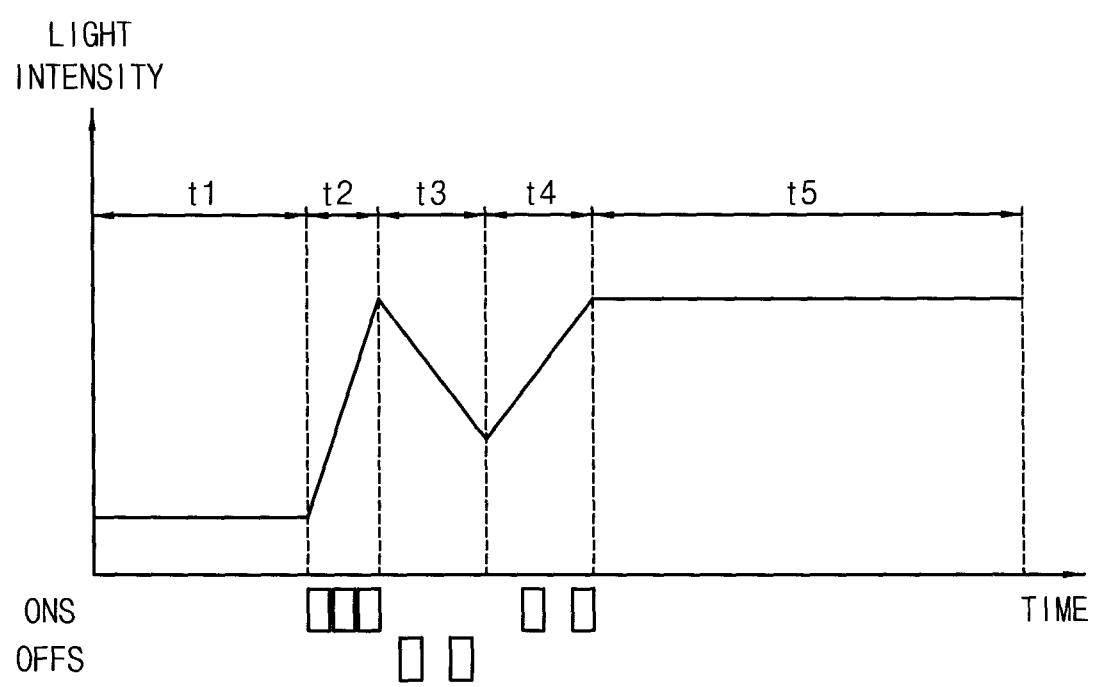
FIG. 7 is a graph for describing an operation of a second signal generation unit of FIG. 5.

FIG. 7 is a graph for describing an operation of a second signal generation unit of FIG. 5.

In FIG. 7, the y-axis represents the intensity of the incident light, and the x-axis represents time.

Referring to FIG. 7, the intensity of the incident light is kept constantly during a first period t1. Therefore, the sensing voltage VS and the accumulation voltage VACCUM may are kept constant such that the second signal generation unit 400a may not generate the on signal ONS and the off signal OFFS.

Since the intensity of the incident light increases with a first slope during a second period t2, the second signal generation unit 400a may generate the on signal ONS three times.

Since the intensity of the incident light decreases with a second slope smaller than the first slope during a third period t3, the second signal generation unit 400a may generate the off signal OFFS two times.

Since the intensity of the incident light increases with the second slope during a fourth period t4, the second signal generation unit 400a may generate the on signal ONS two times.

The intensity of the incident light is kept constantly during a fifth period t5. Therefore, the sensing voltage VS and the accumulation voltage VACCUM may be kept constantly such that the second signal generation unit 400a may not generate the on signal ONS and the off signal OFFS.

As described above with reference to FIGS. 1 to 7, the unit pixel 10 according to example embodiments may generate an amount of photo-charges corresponding to the intensity of the incident light and generate the analog signal AS based on the amount of the generated photo-charges in the first operation mode. The unit pixel 10 may generate the sensing current IS having a magnitude proportional to the intensity of the incident light, and generate the on signal ONS and the off signal OFFS based on a time derivative of the sensing current IS in the second operation mode. As will be described later with reference to FIG. 8, an image sensor including the unit pixel 10 may perform various sensing functions since the unit pixel 10 provides various kinds of information.

Figure 8:
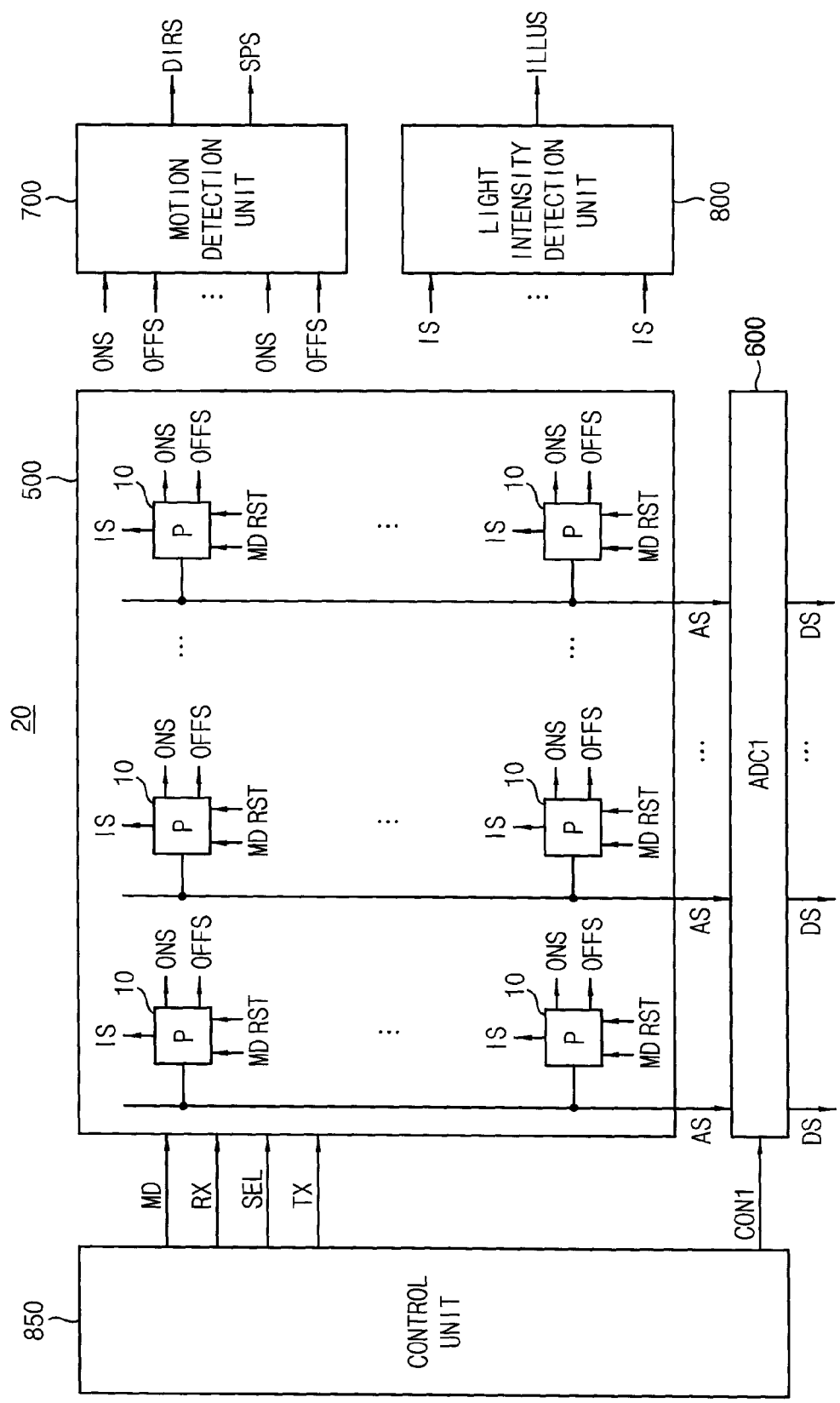
FIG. 8 is a block diagram illustrating an image sensor according to example embodiments.

FIG. 8 is a block diagram illustrating an image sensor according to example embodiments.

Referring to FIG. 8, an image sensor 20 may include a pixel array 500, a first analog-digital conversion unit ADC1 600, a motion detection unit 700, a light intensity detection unit 800 and a control unit 850.

The pixel array 500 may include a plurality of unit pixels P 10 arranged in rows and columns. Each of the unit pixels 10 may operate in the first operation mode or in the second operation mode in response to the mode signal MD. The mode signal MD may be provided from the control unit 850.

In the first operation mode, each of the unit pixels 10 may generate the analog signal AS having a magnitude corresponding to an intensity of incident light in response to the row selection signal SEL, the reset control signal RX and the transmission control signal TX provided from the control unit 850, and provide the analog signal AS to the first analog-digital conversion unit 600.

In the first operation mode, the first analog-digital conversion unit 600 may convert the analog signal AS provided from each of the unit pixels 10 to a digital signal DS based on a control signal CON1 provided from the control unit 850.

In the second operation mode, each of the unit pixels 10 may generate the sensing current IS having a magnitude corresponding to the intensity of the incident light and generate an the signal ONS and the off signal OFFS based on a change of the sensing current IS. For example, in the second operation mode, each of the unit pixels 10 may generate the sensing voltage VS such that the sensing voltage VS is proportional to the sensing current IS, generate the accumulation voltage VACCUM by accumulating a time derivative of the sensing voltage VS, generate the on signal ONS by comparing a magnitude of the accumulation voltage VACCUM and a magnitude of the first reference voltage VR1, and generate the off signal OFFS by comparing the magnitude of the accumulation voltage VACCUM and a magnitude of the second reference voltage VR2. Each of the unit pixels 10 may reset the accumulation voltage VACCUM in response to the reset signal RST.

In the second operation mode, the motion detection unit 700 may detect a motion of a subject based on the on signal ONS and the off signal OFFS provided from each of the unit pixels 10 to generate a direction signal DIRS representing a moving direction of the subject and a speed signal SPS representing a speed of the subject.

In the second operation mode, the light intensity detection unit 800 may detect the intensity of the incident light based on a sum of the sensing currents IS provided from the unit pixels 10 to generate an illuminance data ILLUS.

In some example embodiments, each of the unit pixels 10 included in the image sensor 20 may be implemented with the unit pixel 10 of FIG. 1.

First Operation Mode

Hereinafter, an operation of the image sensor 20 in the first operation mode is described with reference to FIGS. 1 to 8.

For ease of explanation, the operation of the image sensor 20 is described in a case that each of the unit pixels 10 includes the first signal generation unit 300b of FIG. 4. However, embodiments are not limited thereto. For example, the unit pixels 10 may include the first signal generation unit 300a of FIG. 3.

The photoelectric conversion unit 100 included in each of the unit pixels 10 may generate the photo-charges having an amount corresponding to the intensity of the incident light and provide the photo-charges to the first node N1.

In the first operation mode, the control unit 850 may provide the mode signal MD having a first logic level to each of the unit pixels 10. The mode control unit 200 included in each of the unit pixels 10 may be turned off in response to the mode signal MD having the first logic level to prevent the photo-charges from being discharged from the first node N1. Therefore, the photo-charges generated from the photoelectric conversion unit 100 may be accumulated in the first node N1.

The control unit 850 may select one of rows included in the pixel array 500 by providing an activated row selection signal SEL to the selected row of the pixel array 500 to turn on the row selection transistor 341. The control unit 850 may provide an activated reset control signal RX to the selected row to turn on the reset transistor 321. Therefore, the photo-charges stored in the floating diffusion area FD may be discharged to the supply voltage VDD through the reset transistor 321 such that a voltage of the floating diffusion area FD may be initialized to the supply voltage VDD. Since the voltage of the floating diffusion area FD is the supply voltage VDD, the drive transistor 331 may be turned on such that a signal representing a reset element may be outputted through the row selection transistor 341.

After that, the control unit 850 may deactivate the reset control signal RX to turn off the reset transistor 321 and provide an activated transmission control signal TX to the transmission transistor 311 to turn on the transmission transistor 311. Therefore, the photo-charges accumulated in the first node N1 may be transferred to the floating diffusion area FD through the transmission transistor 311. As such, the voltage of the floating diffusion area FD, which corresponds to a voltage of the gate of the drive transistor 331, may be changed based on an amount of the photo-charges transferred from the first node N1 to the floating diffusion area FD. Since the row selection transistor 341 is turned on in response to the activated row selection signal SEL, the analog signal AS corresponding to the voltage of the floating diffusion area FD may be outputted through the row selection transistor 341.

The control unit 850 and the pixel array 500 may repeat above described operations such that the pixel array 500 may generate the analog signal AS row by row.

Although the operation of the image sensor 20 is described above in the case that each of the unit pixels 10 includes the first signal generation unit 300*b* of FIG. 4, each of the unit pixels 10 may include the first signal generation unit 300*a* of FIG. 3.

The first analog-digital conversion unit 600 may convert the analog signal AS provided from the pixel array 500 to a digital signal DS in the first operation mode.

In some example embodiments, the first analog-digital conversion unit 600 may generate the digital signal DS by performing a single slope analog-digital conversion on the analog signal AS. In this case, a ramp signal may be provided from the control unit 850 to the first analog-digital conversion unit 600.

In other example embodiments, the first analog-digital conversion unit 600 may generate the digital signal DS by performing a sigma-delta analog-digital conversion on the analog signal AS.

According to example embodiments, the first analog-digital conversion unit 600 may generate the digital signal DS by performing other kinds of an analog-digital conversion on the analog signal AS.

The digital signal DS generated from the first analog-digital conversion unit 600 in the first operation mode may correspond to a two dimensional image data of the subject. Therefore, the image sensor 20 may operate as a two dimensional image sensor in the first operation mode.

Second Operation Mode

Hereinafter, an operation of the image sensor 20 in the second operation mode according to an example embodiment is described with reference to FIGS. 1 to 8.

The photoelectric conversion unit 100 included in each of the unit pixels 10 may generate an amount of photo-charges corresponding to the intensity of the incident light.

In the second operation mode, the control unit 850 may provide the mode signal MD having a second logic level to each of the unit pixels 10. The mode control unit 200 included in each of the unit pixels 10 may be turned on in response to the mode signal MD having the second logic level to generate the sensing current IS by discharging the photo-charges generated from the photoelectric conversion unit 100. In addition, the mode control unit 200 may generate the sensing voltage VS proportional to the sensing current IS.

The second signal generation unit 400 may generate the accumulation voltage VACCUM by accumulating the time derivative of the sensing voltage VS, generate the on signal ONS by comparing the magnitude of the accumulation voltage VACCUM and the magnitude of the first reference voltage VR1, and generate the off signal OFFS by comparing the magnitude of the accumulation voltage VACCUM and the magnitude of the second reference voltage VR2. The second signal generation unit 400 may reset the accumulation voltage VACCUM in response to the reset signal RST.

Structures and operations of the mode control unit 200 and the second signal generation unit 400 included in each of the unit pixels 10 are described above with reference to FIGS. 1 to 7. Therefore, a detail description of the mode control unit 200 and the second signal generation unit 400 will be omitted.

In the second operation mode, the motion detection unit 700 may detect a motion of the subject based on the on signal ONS and the off signal OFFS provided from each of the unit pixels 10 to generate the direction signal DIRS representing a moving direction of the subject and the speed signal SPS representing a speed of the subject.

Figure 9:
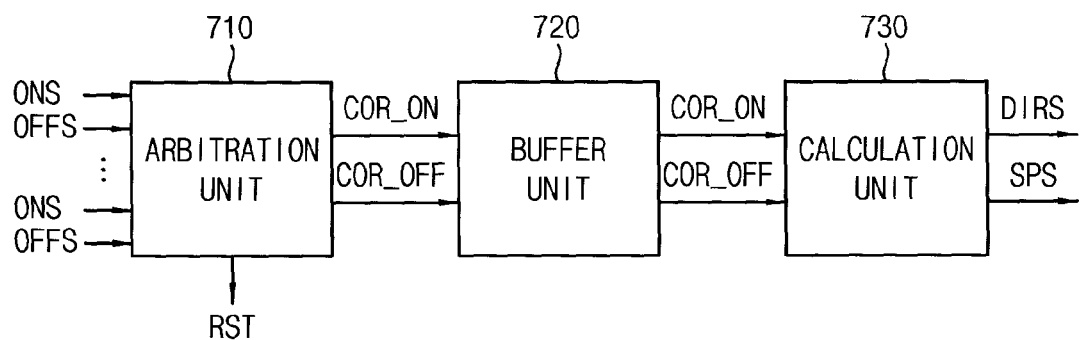
FIG. 9 is a circuit diagram illustrating an example of a motion detection unit included in an image sensor of FIG. 8.

FIG. 9 is a circuit diagram illustrating an example of a motion detection unit included in an image sensor of FIG. 8.

Referring to FIG. 9, the motion detection unit 700 may include an arbitration unit 710, a buffer unit 720 and a calculation unit 730.

When the arbitration unit 710 receives the on signal ONS from the pixel array 500, the arbitration unit 710 may generate an on coordinate COR_ON corresponding to a location of a unit pixel that provided the on signal ONS to the arbitration unit 710 and store the on coordinate COR_ON in the buffer unit 720. When the arbitration unit 710 receives the off signal OFFS from the pixel array 500, the arbitration unit 710 may generate an off coordinate COR_OFF corresponding to a location of a unit pixel that provided the off signal OFFS to the arbitration unit 710 and store the off coordinate COR_OFF in the buffer unit 720.

In addition, when the arbitration unit 710 receives the on signal ONS or the off signal OFFS from the pixel array 500, the arbitration unit 710 may provide the reset signal RST to a unit pixel that provided the on signal ONS or the off signal OFFS. Therefore, whenever the second signal generation unit 400 included in each of the unit pixels 10 generates one of the on signal ONS and the off signal OFFS, the second signal generation unit 400 may reset the accumulation voltage VACCUM, generate the accumulation voltage VACCUM again by accumulating the time derivative of the sensing voltage VS, and generate the on signal ONS and the off signal OFFS based on the accumulation voltage VACCUM.

The calculation unit 730 may calculate a moving direction and a speed of the subject based on the on coordinate COR_ON and the off coordinate COR_OFF stored in the buffer unit 720 to generate the direction signal DIRS representing the moving direction of the subject and the speed signal SPS representing the speed of the subject.

When the subject moves from a first direction to a second direction in front of the unit pixel 10, the intensity of the incident light that the unit pixel 10 receives may increase at first and then decrease, or decrease at first and then increase. For example, in the case that an intensity of a light signal provided from the subject is greater than an intensity of ambient light, the intensity of the incident light that the unit pixel 10 receives may increase at first and then decrease when the subject moves from the first direction to the second direction in front of the unit pixel 10. In the case that an intensity of a light signal provided from the subject is smaller than an intensity of ambient light, the intensity of the incident light that the unit pixel 10 receives may decrease at first and then increase when the subject moves from the first direction to the second direction in front of the unit pixel 10.

As described above with reference to FIGS. 1 to 7, when the intensity of the incident light increases, the sensing voltage VS may increase and the accumulation voltage VACCUM may decrease. If the accumulation voltage VACCUM decreases below the first reference voltage VR1, the unit pixel 10 may output the on signal ONS.

Alternatively, when the intensity of the incident light decreases, the sensing voltage VS may decrease and the accumulation voltage VACCUM may increase. If the accumulation voltage VACCUM increases above the second reference voltage VR2, the unit pixel 10 may output the off signal OFFS.

As a moving speed of the subject increases, a time derivative of the intensity of the incident light that the unit pixel 10 receives increases such that a time interval between the on signals ONS consecutively generated from the unit pixel 10 or a time interval between the off signals OFFS consecutively generated from the unit pixel 10 may decrease.

Therefore, the calculation unit 730 may determine the moving direction of the subject by tracing the on coordinates COR_ON stored in the buffer unit 720 or tracing the off coordinates COR_OFF stored in the buffer unit 720 and generate the direction signal DIRS representing the moving direction of the subject. The calculation unit 730 may determine the speed of the subject based on the number of the on coordinates COR_ON that have a same value and are consecutively stored in the buffer unit 720 or the number of the off coordinates COR_OFF that have a same value and are consecutively stored in the buffer unit 720 and generate the speed signal SPS representing the speed of the subject. For example, the speed of the subject may be proportional to the number of the on coordinates COR_ON that have a same value and are consecutively stored in the buffer unit 720 or the number of the off coordinates COR_OFF that have a same value and are consecutively stored in the buffer unit 720.

As described above, the direction signal DIRS and the speed signal SPS generated from the motion detection unit 700 in the second operation mode may represent a motion of the subject. Therefore, the image sensor 20 may operate as a motion sensor in the second operation mode.

In the second operation mode, as described above, each of the unit pixels 10 may generate the sensing current IS having a magnitude corresponding to the intensity of the incident light, and the light intensity detection unit 800 may detect the intensity of the incident light based on a sum of the sensing currents IS provided from the unit pixels 10 to generate an illuminance data ILLUS.

Figure 10:
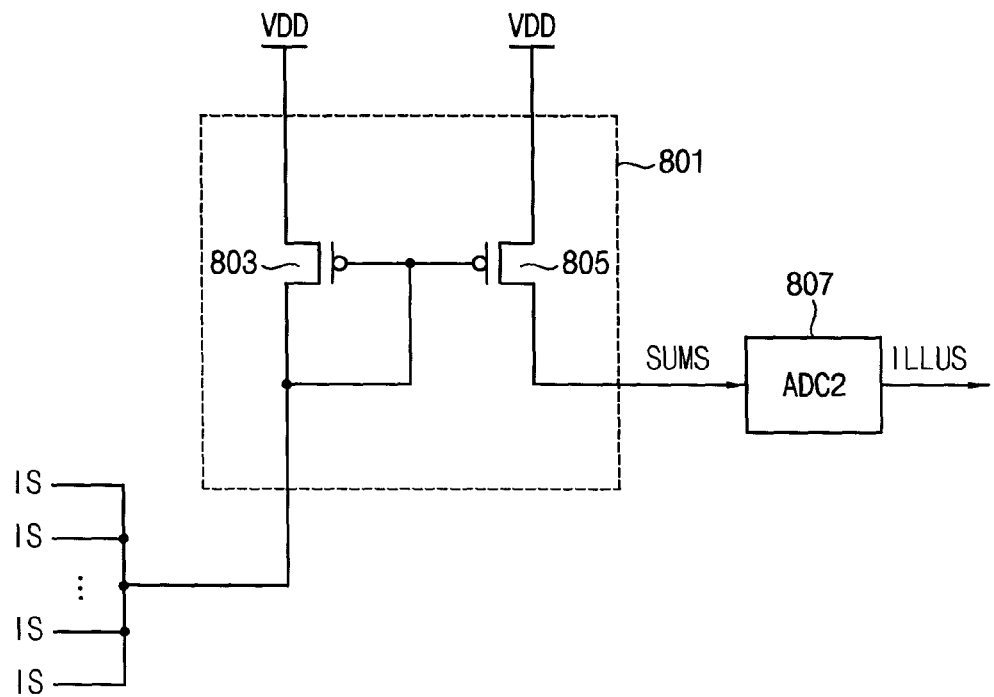
FIG. 10 is a circuit diagram illustrating an example of a light intensity detection unit included in an image sensor of FIG. 8.

FIG. 10 is a circuit diagram illustrating an example of a light intensity detection unit included in an image sensor of FIG. 8.

Referring to FIG. 10, the light intensity detection unit 800 may include a current mirror 801 and a second analog-digital conversion unit ADC2 807.

The current mirror 801 may sum the sensing currents IS provided from the unit pixels 10 to generate a sum signal SUMS.

As illustrated in FIG. 10, the current mirror 801 may include a first p-type metal oxide semiconductor (PMOS) transistor 803 and a second PMOS transistor 805.

A source of the first PMOS transistor 803 and a source of the second PMOS transistor 805 may be coupled to the supply voltage VDD. A gate of the first PMOS transistor 803 and a gate of the second PMOS transistor 805 may be coupled to each other. A drain of the first PMOS transistor 803 may be coupled to a gate of the first PMOS transistor 803 and a gate of the second PMOS transistor 805. A drain of the first PMOS transistor 803 may receive the sensing currents IS provided from the unit pixels 10. Therefore, the sum signal SUMS corresponding to the sum of the sensing currents IS provided from the unit pixels 10 may be outputted from a drain of the second PMOS transistor 805.

The second analog-digital conversion unit 807 may generate the illuminance data ILLUS by performing an analog-digital conversion on the sum signal SUMS.

The second analog-to-digital converter 807 may be any circuit capable of converting an analog signal to a digital signal, for example, a direct-conversion ADC or a ramp-compare ADC. If the second analog-to-digital converter 807 is a ramp-compare ADC, the second analog-to-digital converter 807 may include a counter and a ramp signal generator.

As described above, since the magnitude of the sensing current IS generated from each of the unit pixels 10 in the second operation mode is proportional to the intensity of the incident light, the sum signal SUMS, which corresponds to the sum of the sensing currents IS provided from the unit pixels 10, may be proportional to an illuminance of ambient light. Therefore, the illuminance data ILLUS generated from the light intensity detection unit 800 in the second operation mode may represent the illuminance of the ambient light. As such, the image sensor 20 may operate as an ambient light sensor in the second operation mode.

Figure 11:
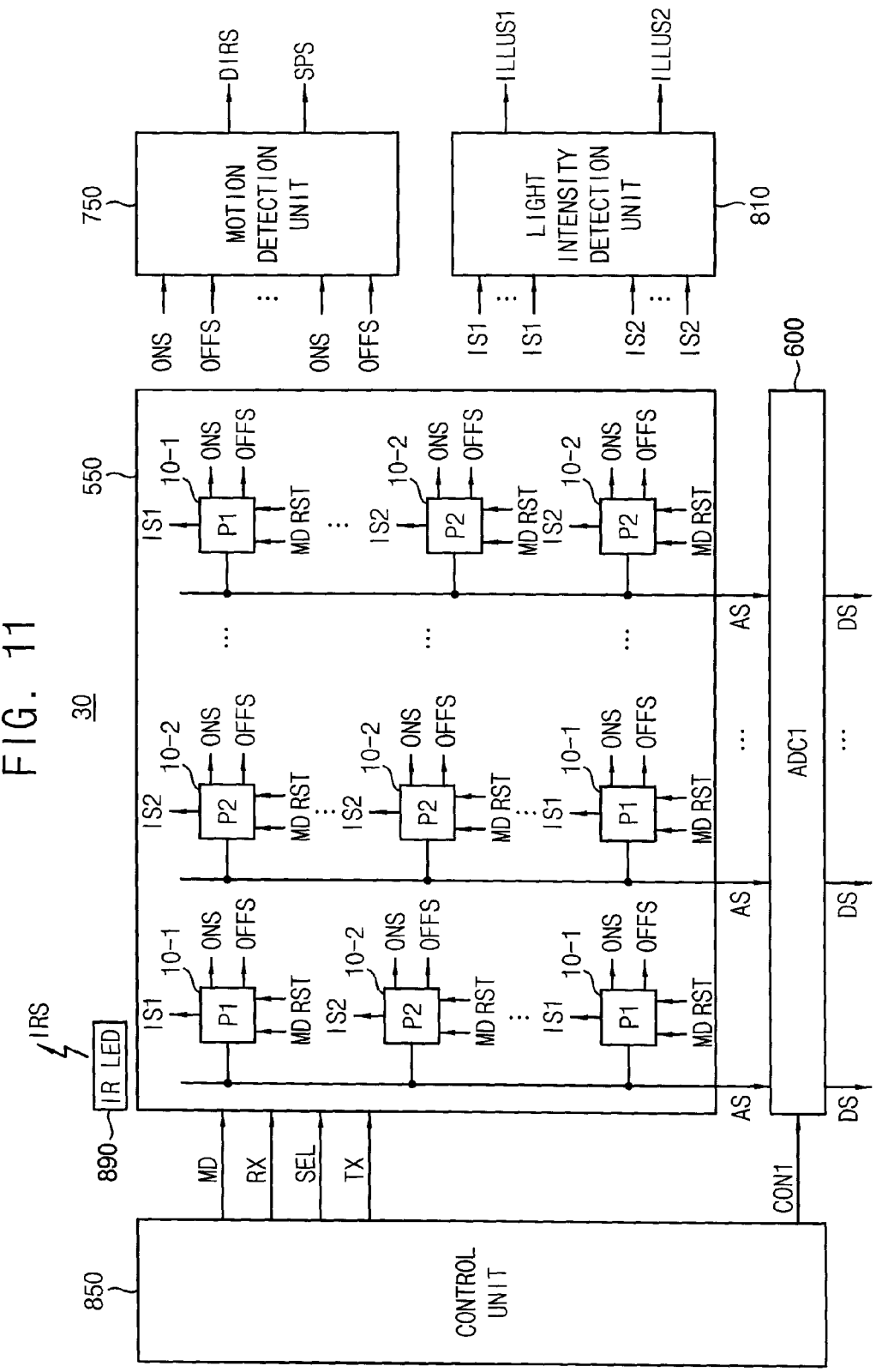
FIG. 11 is a block diagram illustrating an image sensor according to other example embodiments.

FIG. 11 is a block diagram illustrating an image sensor according to other example embodiments.

Referring to FIG. 11, an image sensor 30 may include a pixel array 550, a first analog-digital conversion unit ADC1 600, a motion detection unit 750, a light intensity detection unit 810, a control unit 850 and a light source IR LED 890.

The light source 890 may generate an infrared light signal IRS included in an infrared light range. In some example embodiments, the light source 890 may be turned off in the first operation mode and be turned on to generate the infrared light signal IRS in the second operation mode in response to a mode signal MD provided from the control unit 850.

As illustrated in FIG. 11, the pixel array 550 may include first unit pixels P1 10-1 and second unit pixels P2 10-2 arranged in rows and columns. According to example embodiments, the first unit pixels 10-1 and the second unit pixels 10-2 may be arranged in a regular pattern or in an irregular pattern. In some example embodiments, the number of the first unit pixels 10-1 may be greater than the number of the second unit pixels 10-2. In this case, the second unit pixels 10-2 may be evenly distributed among the first unit pixels 10-1.

The control unit 850 may store location information of the first unit pixels 10-1 and the second unit pixels 10-2 in the pixel array 550.

Each of the first unit pixels 10-1 may include a first filter that selectively passes visible light. Therefore, the incident light that the first unit pixels 10-1 receive may include a light signal of a visible light range.

Each of the second unit pixels 10-2 may include a second filter that selectively passes infrared light. Therefore, the incident light that the second unit pixels 10-2 receive may include a light signal of an infrared light range.

The first unit pixels 10-1 and the second unit pixels 10-2 may have a same structure except that each of the first unit pixels 10-1 includes the first filter and each of the second unit pixels 10-2 includes the second filter. For example, the first unit pixels 10-1 and the second unit pixels 10-2 may be implemented with the unit pixel 10 of FIG. 1. Therefore, the first unit pixels 10-1 may operate as described above with reference to FIGS. 1 to 7 in response to a visible light signal, and the second unit pixels 10-2 may operate as described above with reference to FIGS. 1 to 7 in response to the infrared light signal IRS, which is incident to the pixel array 550 after being reflected by the subject.

In the first operation mode, each of the first unit pixels 10-1 and the second unit pixels 10-2 may generate an analog signal AS having a magnitude corresponding to the intensity of the incident light in response to the row selection signal SEL, the reset control signal RX and the transmission control signal TX provided from the control unit 850, and provide the analog signal AS to the first analog-digital conversion unit 600. The first analog-digital conversion unit 600 may convert the analog signal AS provided from each of the first unit pixels 10-1 and the second unit pixels 10-2 to the digital signal DS.

Since the second unit pixels 10-2 operate in response to a light signal of an infrared light range, the digital signals DS corresponding to the second unit pixels 10-2 may not include an information about a two dimensional image of the subject. Therefore, the control unit 850 may replace the digital signals DS corresponding to the second unit pixels 10-2 with interpolated digital signals that are generated by performing an interpolation with the digital signals DS corresponding to the first unit pixels 10-1. Therefore, the digital signal DS generated from the image sensor 30 in the first operation mode may correspond to a two dimensional image data of the subject. As such, the image sensor 30 may operate as a two dimensional image sensor in the first operation mode.

In the second operation mode, each of the first unit pixels 10-1 may generate a first sensing current IS1 having a magnitude corresponding to an intensity of incident light, which corresponds to visible light, and generate the on signal ONS and the off signal OFFS based on a time derivative of the first sensing current IS1. Each of the second unit pixels 10-2 may generate a second sensing current IS2 having a magnitude corresponding to an intensity of incident light, which corresponds to infrared light, and generate the on signal ONS and the off signal OFFS based on a time derivative of the second sensing current IS2.

In the second operation mode, the motion detection unit 750 may detect a motion of the subject based on the on signal ONS and the off signal OFFS provided from each of the first unit pixels 10-1 to generate the direction signal DIRS representing a moving direction of the subject and the speed signal SPS representing a speed of the subject. In some example embodiments, the motion detection unit 750 may be the same as the motion detection unit 700 of FIG. 9 except that the arbitration unit 710 included in the motion detection unit 750 may discard the on signal ONS and the off signal OFFS provided from the second unit pixels 10-2 and operate in response to the on signal ONS and the off signal OFFS provided from the first unit pixels 10-1. For example, when the arbitration unit 710 included in the motion detection unit 750 receives the on signal ONS from the first unit pixel 10-1, the arbitration unit 710 may generate an on coordinate COR_ON corresponding to a location of the first unit pixel 10-1 that provided the on signal ONS to the arbitration unit 710 and store the on coordinate COR_ON in the buffer unit 720. When the arbitration unit 710 included in the motion detection unit 750 receives the off signal OFFS from the second unit pixel 10-2, the arbitration unit 710 may generate an off coordinate COR_OFF corresponding to a location of the second unit pixel 10-2 that provided the off signal OFFS to the arbitration unit 710 and store the off coordinate COR_OFF in the buffer unit 720.

The calculation unit 730 included in the motion detection unit 750 may operate the same as the calculation unit 730 included in the motion detection unit 700.

As described above, the direction signal DIRS and the speed signal SPS generated from the motion detection unit 750 in the second operation mode may represent a motion of the subject. Therefore, the image sensor 30 may operate as a motion sensor in the second operation mode.

In the second operation mode, the light intensity detection unit 810 may generate a first illuminance data ILLUS1 corresponding to an illuminance of ambient light based on a sum of the first sensing currents IS1 provided from the first unit pixels 10-1, and generate a second illuminance data ILLUS2 corresponding to a distance from the image sensor 30 to the subject based on a sum of the second sensing currents IS2 provided from the second unit pixels 10-2.

FIG. 12 is a circuit diagram illustrating an example of a light intensity detection unit included in an image sensor of FIG. 11.

Referring to FIG. 12, a light intensity detection unit 810a may include a first current mirror 811, a third analog-digital conversion unit ADC3 817, a second current mirror 821 and a fourth analog-digital conversion unit ADC4 827.

The first current mirror 811 may sum the first sensing currents IS1 provided from the first unit pixels 10-1 to generate a first sum signal SUMS 1.

As illustrated in FIG. 12, the first current mirror 811 may include a third PMOS transistor 813 and a fourth PMOS transistor 815.

A source of the third PMOS transistor 813 and a source of the fourth PMOS transistor 815 may be coupled to the supply voltage VDD. A gate of the third PMOS transistor 813 and a gate of the fourth PMOS transistor 815 may be coupled to each other. A drain of the third PMOS transistor 813 may be coupled to a gate of the third PMOS transistor 813 and a gate of the fourth PMOS transistor 815. A drain of the third PMOS transistor 813 may receive the first sensing currents IS1 provided from the first unit pixels 10-1. Therefore, the first sum signal SUMS1 corresponding to the sum of the first sensing currents IS1 provided from the first unit pixels 10-1 may be outputted from a drain of the fourth PMOS transistor 815.

The third analog-digital conversion unit 817 may generate the first illuminance data ILLUS1 by performing an analog-digital conversion on the first sum signal SUMS 1.

As described above, since the magnitude of the first sensing current IS1 generated from each of the first unit pixels 10-1 in the second operation mode is proportional to the intensity of the incident light, which corresponds to visible light, the first sum signal SUMS1, which corresponds to the sum of the first sensing currents IS1 provided from the first unit pixels 10-1, may be proportional to the illuminance of the ambient light. Therefore, the first illuminance data ILLUS1 generated from the third analog-digital conversion unit 817 in the second operation mode may represent the illuminance of the ambient light.

The second current mirror 821 may sum the second sensing currents IS2 provided from the second unit pixels 10-2 to generate a second sum signal SUMS2.

As illustrated in FIG. 12, the second current mirror 821 may include a fifth PMOS transistor 823 and a sixth PMOS transistor 825.

A source of the fifth PMOS transistor 823 and a source of the sixth PMOS transistor 825 may be coupled to the supply voltage VDD. A gate of the fifth PMOS transistor 823 and a gate of the sixth PMOS transistor 825 may be coupled to each other. A drain of the fifth PMOS transistor 823 may be coupled to a gate of the fifth PMOS transistor 823 and a gate of the sixth PMOS transistor 825. A drain of the fifth PMOS transistor 823 may receive the second sensing currents IS2 provided from the second unit pixels 10-2. Therefore, the second sum signal SUMS2 corresponding to the sum of the second sensing currents IS2 provided from the second unit pixels 10-2 may be outputted from a drain of the sixth PMOS transistor 825.

The fourth analog-digital conversion unit 827 may generate the second illuminance data ILLUS2 by performing an analog-digital conversion on the second sum signal SUMS2.

As described above, since the magnitude of the second sensing current IS2 generated from each of the second unit pixels 10-2 in the second operation mode is proportional to the intensity of the incident light, which corresponds to the infrared light signal IRS incident to the pixel array 550 after being reflected by the subject, the magnitude of the second sensing current IS2 may be inversely proportional to a distance from the image sensor 30 to the subject. Therefore, the second sum signal SUMS2, which corresponds to the sum of the second sensing currents IS2 provided from the second unit pixels 10-2, may be inversely proportional to the distance from the image sensor 30 to the subject. Therefore, the second illuminance data ILLUS2 generated from the fourth analog-digital conversion unit 827 in the second operation mode may represent the distance from the image sensor 30 to the subject.

As such, the image sensor 30 may operate as both an ambient light sensor and a proximity sensor in the second operation mode.

Figure 13:
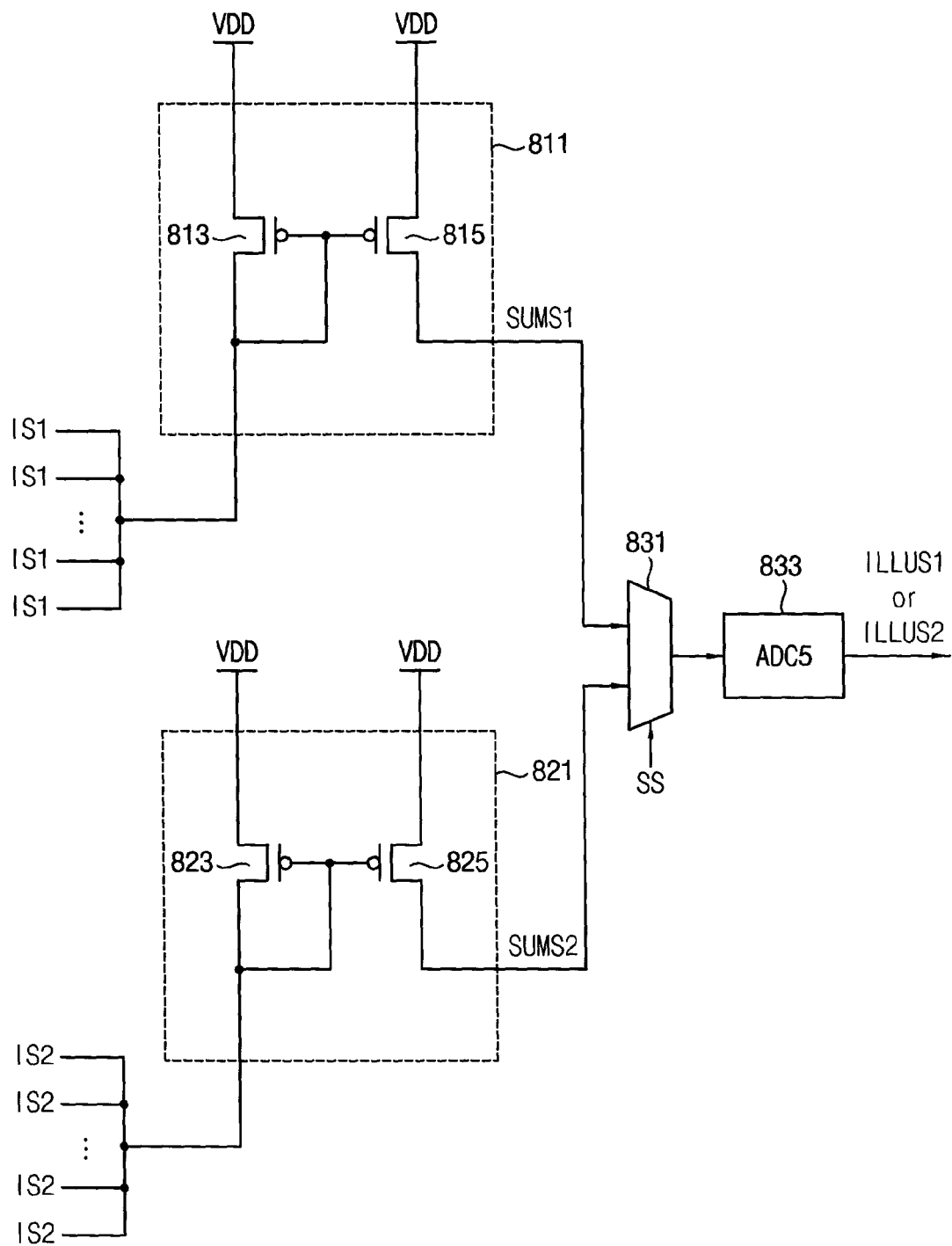
FIG. 13 is a circuit diagram illustrating another example of a light intensity detection unit included in an image sensor of FIG. 11.

FIG. 13 is a circuit diagram illustrating another example of a light intensity detection unit included in an image sensor of FIG. 11.

Referring to FIG. 13, a light intensity detection unit 810b may include the first current mirror 811, the second current mirror 821, a multiplexer 831 and a fifth analog-digital conversion unit ADC5 833.

The first current mirror 811 and the second current mirror 821 included in the light intensity detection unit 810b of FIG. 13 may be the same as the first current mirror 811 and the second current mirror 821 included in the light intensity detection unit 810a of FIG. 12. A structure and an operation of the first current mirror 811 and the second current mirror 821 included in the light intensity detection unit 810a of FIG. 12 are described above with reference to FIG. 12. Therefore, a detail description of the first current mirror 811 and the second current mirror 821 of FIG. 13 will be omitted.

The multiplexer 831 may output one of the first sum signal SUMS1 and the second sum signal SUMS2 in response to a selection signal SS. The selection signal SS may be provided from the control unit 850.

The fifth analog-digital conversion unit 833 may generate one of the first illuminance data ILLUS1 and the second illuminance data ILLUS2 by performing an analog-digital conversion on an output signal of the multiplexer 831. For example, the fifth analog-digital conversion unit 833 may generate the first illuminance data ILLUS1 when the multiplexer 831 outputs the first sum signal SUMS1, and generate the second illuminance data ILLUS2 when the multiplexer 831 outputs the second sum signal SUMS2.

As described above with reference to FIG. 12, the first illuminance data ILLUS1 generated from the light intensity detection unit 810b in the second operation mode may represent the illuminance of the ambient light, and the second illuminance data ILLUS2 generated from the light intensity detection unit 810b in the second operation mode may represent the distance from the image sensor 30 to the subject. Therefore, the image sensor 30 may operate as an ambient light sensor or a proximity sensor in the second operation mode.

As described above with reference to FIGS. 1 to 13, the image sensor according to example embodiments may operate as a two dimensional image sensor, a motion sensor, an ambient light sensor and a proximity sensor according to an operation mode. Therefore, an electronic device including the image sensor according to example embodiments may reduce power consumption and a size compared to an electronic device including a two dimensional image sensor, a motion sensor, an ambient light sensor and a proximity sensor separately.

Figure 14:
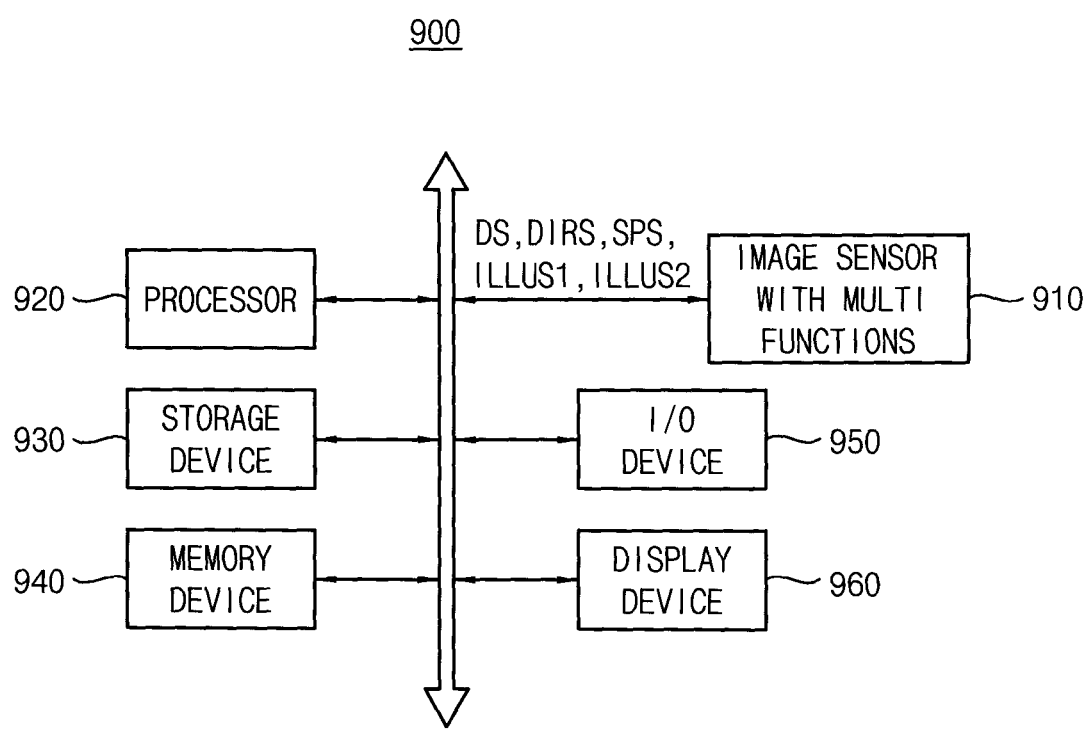
FIG. 14 is a block diagram illustrating a computing system including an image sensor according to an example embodiment.

FIG. 14 is a block diagram illustrating a computing system including an image sensor according to an example embodiment.

Referring to FIG. 14, a computing system 900 may include an image sensor 910, a processor 920 and a storage device 930.

The computing system 900 may further include a memory device 940, an input/output device 950 and a display device 960. Although it is not illustrated in FIG. 14, the computing system 900 may further include ports that communicate with a video card, a sound card, a memory card, a universal serial bus (USB) device, or other electronic devices.

In a first operation mode, the image sensor 910 may generate a digital signal DS representing a two dimensional image data of a subject in response to incident light. In a second operation mode, the image sensor 910 may generate a direction signal DIRS representing a moving direction of the subject, a speed signal SPS representing a speed of the subject and a first illuminance data ILLUS1 representing an illuminance of ambient light. In some example embodiments, the image sensor 910 may further generate a second illuminance data ILLUS2 representing a distance from the image sensor 910 to the subject in the second operation mode. Therefore, the image sensor 910 may operate as a two dimensional image sensor, a motion sensor, an ambient light sensor and a proximity sensor according to an operation mode.

The image sensor 910 may be implemented with one of the image sensor 20 of FIG. 8 and the image sensor 30 of FIG. 11. A structure and an operation of the image sensor 20 of FIG. 8 and the image sensor 30 of FIG. 11 are described above with reference to FIGS. 1 to 13. Therefore, a detail description of the image sensor 910 will be omitted.

The storage device 930 may store the digital signal DS provided from the image sensor 910. The storage device 930 may include a non-volatile memory device such as a flash memory device, a solid state drive (SSD), a hard disk drive (HDD), a compact disk read-only memory (CD-ROM) drive, etc.

The processor 920 may control operations of the computing system 900 based on the direction signal DIRS, the speed signal SPS, the first illuminance data ILLUS1 and the second illuminance data ILLUS2 provided from the image sensor 910.

Figure 15A:
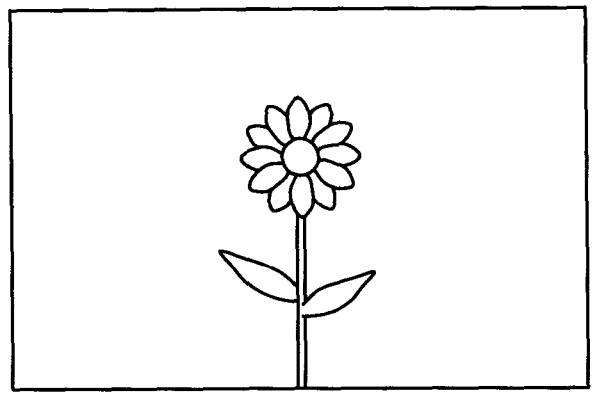
FIGS. 15A, 15B, 15C and 15D are diagrams for describing an operation of a computing system of FIG. 14.
Figure 15B:
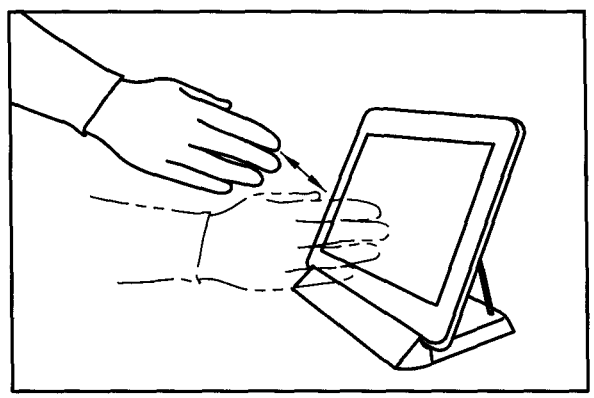
Figure 15C:
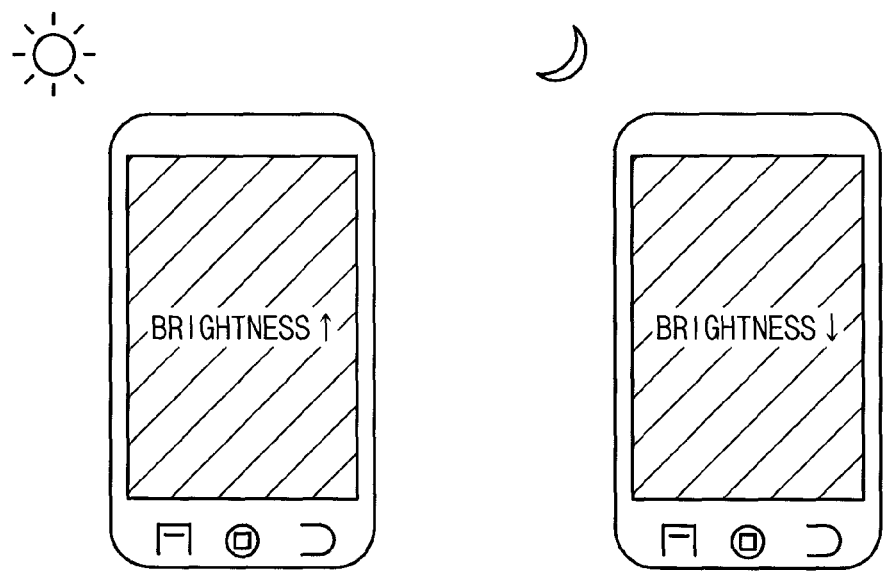

FIGS. 15A, 15B and 15C are diagrams for describing an operation of a computing system of FIG. 14.

As illustrated in FIG. 15A, in the first operation mode, the image sensor 910 may generate the digital signal DS representing a two dimensional image of the subject, and the processor 920 may display the digital signal DS on the display device 960.

As illustrated in FIG. 15B, in the second operation mode, the image sensor 910 may detect a motion of a user to generate the direction signal DIRS representing a moving direction of the user and the speed signal SPS representing a speed of the user, and the processor 920 may generate an input command corresponding to a motion of the user based on the direction signal DIRS and the speed signal SPS. Therefore, the computing system 900 may implement a touchless input system.

As illustrated in FIG. 15C, in the second operation mode, the image sensor 910 may generate the first illuminance data ILLUS1 representing an illuminance of the ambient light, and the processor 920 may increase brightness of the display device 960 when the illuminance of the ambient light is relatively high and decrease brightness of the display device 960 when the illuminance of the ambient light is relatively low based on the first illuminance data ILLUS1. Therefore, a visibility of the display device 960 included in the computing system 900 may be improved.

Figure 15D:
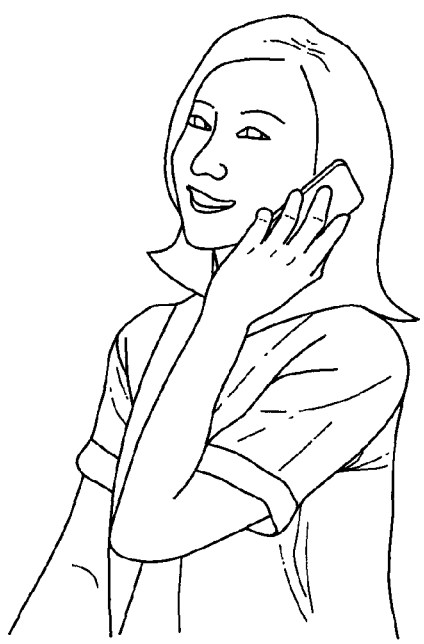

As illustrated in FIG. 15D, in the second operation mode, the image sensor 910 may generate the second illuminance data ILLUS2 representing a distance from the image sensor 910 to the subject, and the processor 920 may turn off a touch screen device when the distance is smaller than a desired (or alternatively, a predetermined) distance based on the second illuminance data ILLUS2. Therefore, the computing system 900 may prevent malfunction caused by an unintentional touch input from the touch screen device when a user uses the computing system 900 in a short distance such as using the computing system 900 as a phone. Further, the computing system 900 may improve a battery life of the computing system 900 by turning off the touch screen device based on the determined distance.

Referring again to FIG. 14, the processor 920 may perform various calculations or tasks. According to some embodiments, the processor 920 may be a microprocessor or a CPU. The processor 920 may communicate with the storage device 930, the memory device 940 and the input/output device 950 via an address bus, a control bus, and/or a data bus. In some example embodiments, the processor 920 may be coupled to an extended bus, such as a peripheral component interconnection (PCI) bus.

The memory device 940 may store data required for an operation of the computing system 900. The memory device 940 may be a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 950 may include a touch screen device, a keypad, a keyboard, a mouse, a printer, a speaker, etc.

The display device 960 may include a liquid crystal display (LCD) device, an organic light emitting diode (OLED) display device, etc.

The image sensor 910 may be connected to the processor 920 through one or more of the above buses or other communication links to communicate with the processor 920.

The image sensor 910 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

According to example embodiments, the image sensor 910 may be integrated with the processor 920 in one chip, or the image sensor 910 and the processor 920 may be implemented as separate chips.

The computing system 900 may be any computing system using an image sensor. For example, the computing system 900 may include a digital camera, a mobile phone, a smart phone, a portable multimedia player (PMP), a personal digital assistant (PDA), etc.

Figure 16:
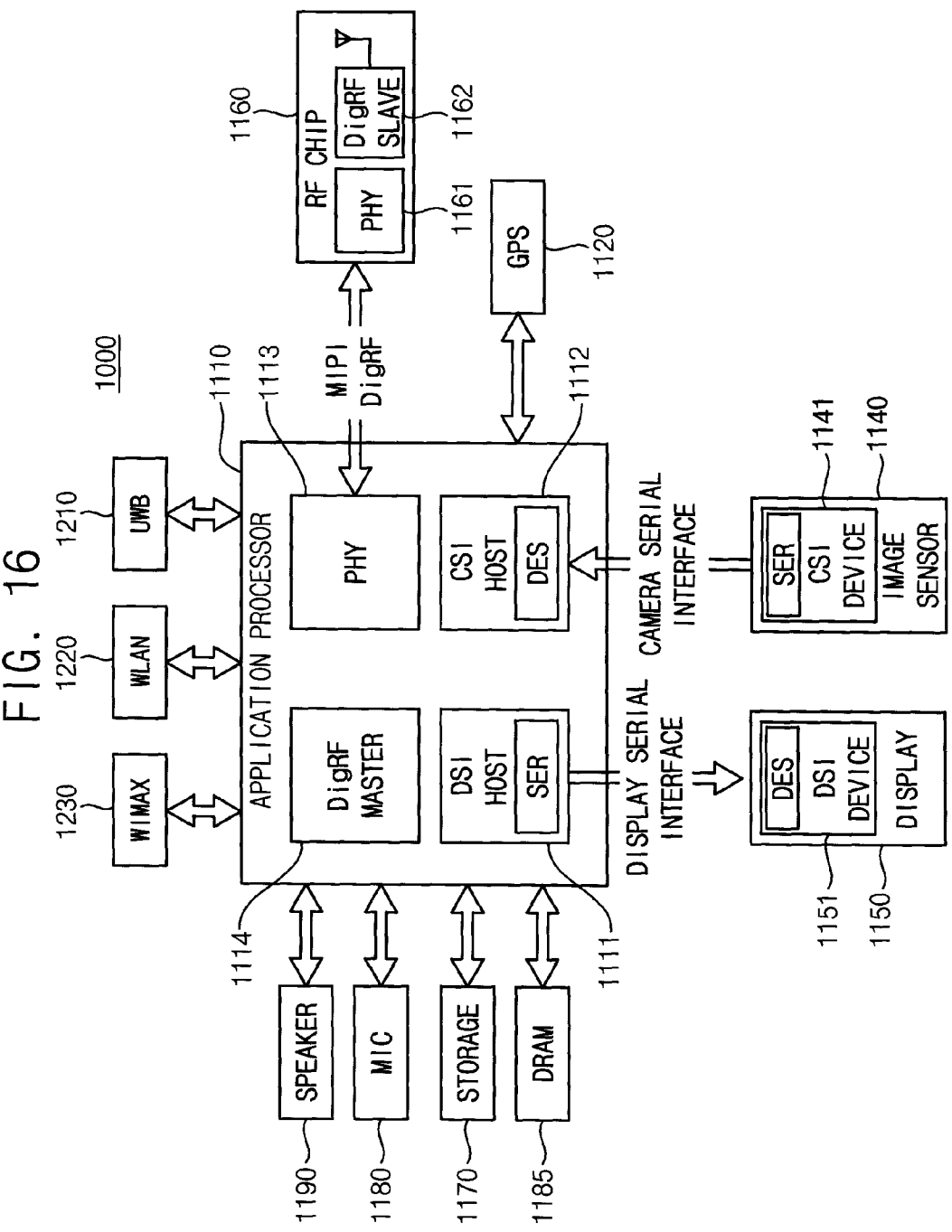
FIG. 16 is a block diagram illustrating an example of an interface used in the computing system of FIG. 14.

FIG. 16 is a block diagram illustrating an example of an interface used in the computing system of FIG. 14.

Referring to FIG. 16, a computing system 1000 may be implemented by a data processing device (e.g., a cellular phone, a personal digital assistant, a portable multimedia player, a smart phone, etc.) that uses or supports a mobile industry processor interface (MIPI) interface. The computing system 1000 may include an application processor 1110, an image sensor 1140, a display device 1150, etc.

A CSI host 1112 of the application processor 1110 may perform a serial communication with a CSI device 1141 of the image sensor 1140 via a camera serial interface (CSI). In some embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI). In some example embodiments, the DSI host 1111 may include a serializer (SER), and the DSI device 1151 may include a deserializer (DES).

The computing system 1000 may further include a radio frequency (RF) chip 1160 performing a communication with the application processor 1110. A physical layer (PHY) 1113 of the computing system 1000 and a physical layer (PHY) 1161 of the RF chip 1160 may perform data communications based on a MIPI DigRF. The application processor 1110 may further include a DigRF MASTER 1114 that controls the data communications according to the MIPI DigRF of the PHY 1161, and the RF chip 1160 may further include a DigRF SLAVE 1162 controlled by the DigRF MASTER 1114.

The computing system 1000 may further include a global positioning system (GPS) 1120, a storage 1170, a MIC 1180, a DRAM device 1185, and a speaker 1190. In addition, the computing system 1000 may perform communications using an ultra wideband (UWB) 1210, a wireless local area network (WLAN) 1220, a worldwide interoperability for microwave access (WIMAX) 1230, etc. However, the structure and the interface of the computing system 1000 are not limited thereto.

The foregoing is illustrative of the example embodiments of the inventive concepts and is not to be construed as limiting thereof. Although a few example embodiments have been described, those skilled in the art will readily appreciate that many modifications are possible in the example embodiments without materially departing from the novel teachings and advantages of the inventive concepts. Accordingly, all such modifications are intended to be included within the scope of the inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A unit pixel of an image sensor, comprising:
   a photoelectric conversion unit configured to,
     generate photo-charges in response to incident light, and
     provide the photo-charges to a first node;
   a mode control unit configured to,
     prevent the photo-charges from being discharged from the first node in a first operation mode, and
     generate, in a second operation mode, a sensing current and a sensing voltage, the mode control unit configured to generate the sensing current by discharging the photo-charges, the sensing voltage being proportional to the sensing current;
   a first signal generation unit configured to generate an analog signal indicating an amount of the photo-charges accumulated in the first node in the first operation mode; and
   a second signal generation unit configured to generate an on signal and an off signal based on a time derivative of the sensing voltage in the second operation mode such that the second signal generating unit generates the on signal and the off signal more frequently as an intensity of the incident light on the unit pixel increases.

2. The unit pixel of claim 1, wherein the mode control unit includes:
   an n-type metal oxide semiconductor (NMOS) transistor, the NMOS transistor including a gate, a source coupled to the first node and a drain configured to output the sensing current;
   an amplifier coupled between the first node and the gate of the NMOS transistor, the amplifier configured to generate the sensing voltage proportional to the sensing current; and
   a switch coupled between the gate of the NMOS transistor and a ground voltage, the switch configured to turn on in the first operation mode and turn off in the second operation mode, the first operation mode and the second operation mode indicated by a mode signal.

3. The unit pixel of claim 1, wherein the second signal generation unit includes:
   a differentiation unit configured to generate an accumulation voltage by accumulating the time derivative of the sensing voltage;
   a first comparator configured to output the on signal based on a magnitude of the accumulation voltage and a magnitude of a first reference voltage; and
   a second comparator configured to output the off signal based on the magnitude of the accumulation voltage and a magnitude of a second reference voltage.

4. The unit pixel of claim 3, wherein the differentiation unit is configured to reset the accumulation voltage in response to a reset signal.

5. The unit pixel of claim 1, wherein the first signal generation unit includes:
   a reset transistor including a source coupled to the first node, a drain coupled to a supply voltage, and a gate configured to receive a reset control signal;
   a drive transistor including a source, a drain coupled to the supply voltage, and a gate coupled to the first node; and
   a row selection transistor including a drain coupled to the source of the drive transistor, a gate configured to receive a row selection signal, and a source configured to output the analog signal.

6. The unit pixel of claim 1, wherein the first signal generation unit includes:
   a transmission transistor including a source coupled to the first node, a drain corresponding to a floating diffusion area, and a gate configured to receive a transmission control signal;
   a reset transistor including a source coupled to the floating diffusion area, a drain coupled to a supply voltage, and a gate configured to receive a reset control signal;
   a drive transistor including a source, a drain coupled to the supply voltage, and a gate coupled to the floating diffusion area; and
   a row selection transistor including a drain coupled to the source of the drive transistor, a gate configured to receive a row selection signal, and a source configured to output the analog signal.

7. An image sensor, comprising:
   a pixel array including a plurality of unit pixels arranged in rows and columns, each of the unit pixels configured to,
     generate an analog signal having a magnitude indicating an intensity of incident light in a first operation mode, and
     generate, in a second operation mode, a sensing current having a magnitude corresponding to the intensity of the incident light and an on signal and an off signal based on a time derivative of a sensing voltage that is proportional to the sensing current such that the unit pixels generate the on signal and the off signal more frequently as an intensity of the incident light on a respective one of the unit pixels increases;
   a first analog-digital conversion unit configured to convert the analog signal to a digital signal in the first operation mode;
   a motion detection unit configured to detect a motion of a subject based on the on signal and the off signal provided from the unit pixels in the second operation mode; and
   a light intensity detection unit configured to detect the intensity of the incident light based on a sum of the sensing currents provided from the unit pixels in the second operation mode.

8. The image sensor of claim 7, wherein, in the second operation mode, each of the unit pixels is configured to,
   generate the sensing voltage proportional to the sensing currents,
   generate an accumulation voltage by accumulating the time derivative of the sensing voltage,
   generate the on signal based on a magnitude of the accumulation voltage and a magnitude of a first reference voltage, and
   generate the off signal based on the magnitude of the accumulation voltage and a magnitude of a second reference voltage.

9. The image sensor of claim 7, wherein each of the unit pixels includes:
   a photoelectric conversion unit configured to, generate photo-charges in response to the incident light, and
provide the photo-charges to a first node;
a mode control unit configured to,
prevent the photo-charges from being discharged from the first node in the first operation mode, and
generate, in the second operation mode, the sensing current by discharging the photo-charges and a sensing voltage proportional to the sensing current;
a first signal generation unit configured to generate the analog signal based on an amount of the photo-charges accumulated in the first node in the first operation mode; and
a second signal generation unit configured to generate the on signal and the off signal based on the time derivative of the sensing voltage in the second operation mode.

10. The image sensor of claim 9, wherein the motion detection unit includes:
a buffer unit;
an arbitration unit configured to,
store an on coordinate in the buffer unit based on the on signal, the on coordinate corresponding to a location of the unit pixel generating the on signal, and
store an off coordinate in the buffer unit based on the off signal, the off coordinate corresponding to a location of a unit pixel that generated the off signal; and
a calculation unit configured to calculate a moving direction and a speed of the subject based on the on coordinate and the off coordinate stored in the buffer unit.

11. The image sensor of claim 10, wherein the second signal generation unit includes:
a differentiation unit configured to,
generate an accumulation voltage by accumulating a time derivative of the sensing voltage, and
reset the accumulation voltage in response to a reset signal;
a first comparator configured to output the on signal based on a magnitude of the accumulation voltage and a magnitude of a first reference voltage; and
a second comparator configured to output the off signal based on the magnitude of the accumulation voltage and a magnitude of a second reference voltage,
wherein the arbitration unit is configured to provide the reset signal to a respective one of the unit pixels when receiving the on signal or the off signal from the respective unit pixel.

12. The image sensor of claim 7, wherein the light intensity detection unit includes:
a current mirror configured to generate a sum signal indicative of a sum of the sensing currents provided from the unit pixels; and
a second analog-digital conversion unit configured convert the sum signal to digital illuminance data that corresponds to an illuminance of ambient light.

13. The image sensor of claim 7, further comprising:
a light source configured to generate an infrared light signal, and wherein
the pixel array includes,
first unit pixels configured to operate in response to a visible light signal; and
second unit pixels configured to operate in response to the infrared light signal, which is incident to the pixel array after being reflected by the subject; and
the light intensity detection unit is configured to generate,
first illuminance data corresponding to an illuminance of ambient light based on a sum of the sensing currents provided from the first unit pixels, and
second illuminance data corresponding to a distance from the pixel array to the subject based on a sum of the sensing currents provided from the second unit pixels.

14. The image sensor of claim 13, wherein the light intensity detection unit includes,
a first current mirror configured to generate a first sum signal indicative of a sum of the sensing currents provided from the first unit pixels;
a second analog-digital conversion unit configured to convert the first sum signal to a digital signal representing the first illuminance data;
a second current mirror configured to sum the sensing currents provided from the second unit pixels to generate a second sum signal; and
a third analog-digital conversion unit configured to generate the second illuminance data by performing an analog-digital conversion on the second sum signal.

15. The image sensor of claim 13, wherein the light intensity detection unit includes:
a first current mirror configured to generate a first sum signal indicative of a sum of the sensing currents provided from the first unit pixels;
a second current mirror configured to generate a second sum signal indicative of a sum of the sensing currents provided from the second unit pixels;
a multiplexer configured to output one of the first sum signal and the second sum signal in response to a selection signal; and
a second analog-digital conversion unit configured to convert an output signal of the multiplexer to a digital signal representing one of the first illuminance data and the second illuminance data.

16. An image sensor comprising:
an array of unit pixels including photoelectric converters, the units pixels including at least first unit pixels configured to,
detect an intensity of visible light reflected thereon by accumulating charges by corresponding ones of the photoelectric converters, and
sense at least illuminance of the light and motion of a subject based on the intensity of the visible light by (i) discharging the photo-charges to generate a first sensing current, and (ii) generating an on signal and an off signal based on a time derivative of a sensing voltage that is proportional to the first sensing current such that the first unit pixels generate the on signal and the off signal more frequently as an intensity of the incident light on the first unit pixels increases.

17. The image sensor of claim 16, wherein each of the first unit pixels is configured to detect the intensity of the visible light by accumulating the charges at a respective first node, if the image sensor is in a first operation mode, and
the first unit pixels are configured to sense the motion and the illuminance, if the image sensor is in a second operation mode.

18. The image sensor of claim 17, wherein, in the second operation mode, the first unit pixels are configured to,
generate the first sensing current having a magnitude corresponding to the intensity of the visible light by discharging the accumulated charges at the first nodes of the first unit pixels, accumulate the sensing voltage proportional to the intensity of the visible light in the first unit pixels, generate comparison signals if the sensing voltage is greater than or less than reference voltages, and reset the sensing voltage based on the comparison signals.

19. The image sensor of claim 18, wherein the image sensor further comprises:

a motion detection unit configured to, sense a speed of the subject based on a time interval between the comparison signals stored in a buffer, and sense a direction of the subject based on which one of the first unit pixels in the array are generating the comparison signals; and a light intensity detection unit configured to sense the illuminance based on a sum of the first sensing currents.

20. The image sensor of claim 19, wherein the unit pixels further include second unit pixels, each of the second unit pixels configured to, detect an intensity of an infrared light reflected thereon from the subject by accumulating charges at a respective first node, the accumulated charges being generated by corresponding ones of the photoelectric converters, and generate a second sensing current having a magnitude corresponding to the intensity of the infrared light by discharging the accumulated charges at the first nodes of the second unit pixels; and the light intensity detection unit is further configured to sense a proximity to the subject based on a sum of the second sensing currents.

* * * * *